US012776661B2

(12) United States Patent
Yakubo et al.

(10) Patent No.: US 12,776,661 B2
(45) Date of Patent: Oct. 27, 2026

(54) CONTROL SYSTEM FOR SECONDARY BATTERY

(71) Applicant: SEMICONDUCTOR ENERGY LABORATORY CO., LTD., Atsugi (JP)

(72) Inventors: Yuto Yakubo, Atsugi (JP); Hiroshi Kadoma, Sagamihara (JP); Kaori Ogita, Isehara (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 802 days.

(21) Appl. No.: 18/040,480

(22) PCT Filed: Aug. 2, 2021

(86) PCT No.: PCT/IB2021/057029

§ 371 (c)(1),
(2) Date: Feb. 3, 2023

(87) PCT Pub. No.: WO2022/034428

PCT Pub. Date: Feb. 17, 2022

(65) Prior Publication Data

US 2023/0291237 A1 Sep. 14, 2023

(30) Foreign Application Priority Data

Aug. 12, 2020 (JP) ................................ 2020-136440

(51) Int. Cl.
*H02J 50/10* (2016.01)
*H01M 10/615* (2014.01)
(Continued)

(52) U.S. Cl.
CPC ........... *H02J 50/10* (2016.02); *H01M 10/615* (2015.04); *H01M 10/633* (2015.04);
(Continued)

(58) Field of Classification Search
CPC ........ H02J 50/10; H02J 7/0013; H02J 7/0047; H02J 7/0048; H02J 7/007194; H02J 7/02;
(Continued)

(56) References Cited

U.S. PATENT DOCUMENTS 10,741,834 B2 8/2020 Zhang et al.
12,191,739 B2 1/2025 Nishimura et al.
(Continued)

FOREIGN PATENT DOCUMENTS

CN 105655554 A 6/2016
CN 113140726 A 7/2021
(Continued)

OTHER PUBLICATIONS

International Search Report (Application No. PCT/IB2021/057029) Dated Oct. 26, 2021.
(Continued)

*Primary Examiner* — Paul Dinh
(74) *Attorney, Agent, or Firm* — Fish & Richardson P.C.

(57) ABSTRACT

A control system for a secondary battery that effectively performs temperature control of the secondary battery before getting to a charging station, thereby enabling high speed charging, is provided. It relates to a vehicle including a first secondary battery, a second secondary battery, a first temperature control unit, a secondary battery monitoring unit, and an arithmetic unit. The secondary battery monitoring unit acquires remaining amount data of the first secondary battery. The arithmetic unit compares the remaining amount data and a set value. In the case where the remaining amount data is smaller than the set value, the secondary battery monitoring unit acquires the temperature of the first secondary battery. The arithmetic unit calculates an adjustment term required to adjust the temperature of the first secondary battery to a set temperature. The arithmetic
(Continued)

unit calculates an arrival term required to get to a set charging station. The first temperature control unit starts adjusting the temperature of the first secondary battery to the set temperature, with electric power fed from the second secondary battery, in the case where the adjustment term is shorter than or equal to the arrival term.

18 Claims, 22 Drawing Sheets

(51) Int. Cl.
*H01M 10/633* (2014.01)
*H01M 10/6551* (2014.01)
*B60L 53/12* (2019.01)
*B60L 58/22* (2019.01)
*B60L 58/27* (2019.01)

(52) U.S. Cl.
CPC ......... *H01M 10/6551* (2015.04); *B60L 53/12* (2019.02); *B60L 58/22* (2019.02); *B60L 58/27* (2019.02); *B60L 2240/545* (2013.01); *B60L 2240/547* (2013.01)

(58) Field of Classification Search
CPC ............ H02J 2310/48; H02J 7/00; H02J 7/04; H01M 10/615; H01M 10/633; H01M 10/6551; H01M 2010/4271; H01M 2010/4278; H01M 2220/20; H01M 10/0525; H01M 10/425; H01M 10/443; H01M 10/486; H01M 10/052; H01M 10/0566; H01M 10/44; H01M 10/46; H01M 10/48; H01M 10/613; H01M 10/625; H01M 10/643; H01M 10/647; H01M 10/651; H01M 10/6556; H01M 50/20; H01M 10/637; B60L 53/12; B60L 58/22; B60L 58/27; B60L 2240/545; B60L 2240/547; B60L 50/64; B60L 50/66; B60L 58/21; B60L 2240/622; B60L 58/26; B60L 58/24; B60L 58/20; Y02E 60/10; Y02T 10/70; Y02T 10/7072; Y02T 90/14; B60Y 2200/91
USPC .......................................................... 320/108
See application file for complete search history.

(56) References Cited

U.S. PATENT DOCUMENTS

| | | | |
|---|---|---|---|
| 2002/0110736 | A1 | 8/2002 | Kweon. et al. |
| 2003/0104279 | A1 | 6/2003 | Miyazaki et al. |
| 2004/0142241 | A1 | 7/2004 | Nagayama |
| 2006/0210868 | A1 | 9/2006 | Kim et al. |
| 2006/0263690 | A1 | 11/2006 | Suhara et al. |
| 2007/0117014 | A1 | 5/2007 | Saito et al. |
| 2008/0241693 | A1 | 10/2008 | Fukuchi et al. |
| 2009/0087362 | A1 | 4/2009 | Sun. et al. |
| 2009/0104532 | A1 | 4/2009 | Hosoya |
| 2010/0086854 | A1 | 4/2010 | Kumar et al. |
| 2010/0247986 | A1 | 9/2010 | Toyama. et al. |
| 2013/0052534 | A1 | 2/2013 | Fujiki et al. |
| 2013/0323596 | A1 | 12/2013 | Morita et al. |
| 2014/0212759 | A1 | 7/2014 | Blangero et al. |
| 2015/0008364 | A1 | 1/2015 | Endo |
| 2016/0006032 | A1 | 1/2016 | Paulsen et al. |
| 2016/0013478 | A1 | 1/2016 | Satow. et al. |
| 2016/0156032 | A1 | 6/2016 | Lee. et al. |
| 2016/0268601 | A1 | 9/2016 | Paulsen et al. |
| 2016/0276659 | A1 | 9/2016 | Choi et al. |
| 2017/0008419 | A1* | 1/2017 | Kim .......................... B60L 1/02 |
| 2018/0013130 | A1 | 1/2018 | Ochiai et al. |
| 2018/0145317 | A1 | 5/2018 | Momma. et al. |
| 2018/0145368 | A1 | 5/2018 | Ochiai et al. |
| 2019/0245199 | A1 | 8/2019 | Zeng et al. |
| 2019/0294173 | A1* | 9/2019 | Szubbocsev ......... G05D 1/0274 |
| 2020/0176770 | A1 | 6/2020 | Takahashi et al. |
| 2020/0220173 | A1 | 7/2020 | Jo et al. |
| 2021/0083281 | A1 | 3/2021 | Mikami et al. |
| 2021/0313571 | A1 | 10/2021 | Momma. et al. |
| 2022/0131146 | A1 | 4/2022 | Saito et al. |
| 2022/0359870 | A1 | 11/2022 | Mikami et al. |
| 2025/0096664 | A1 | 3/2025 | Nishimura et al. |
| 2025/0105282 | A1 | 3/2025 | Liu et al. |

FOREIGN PATENT DOCUMENTS

| | | | |
|---|---|---|---|
| JP | 2000-203842 | A | 7/2000 |
| JP | 2002-216760 | A | 8/2002 |
| JP | 2006-269426 | A | 10/2006 |
| JP | 2010-040457 | A | 2/2010 |
| JP | 2010-080407 | A | 4/2010 |
| JP | 2013-183523 | A | 9/2013 |
| JP | 2014-157735 | A | 8/2014 |
| JP | 2015-099722 | A | 5/2015 |
| JP | 2016-082677 | A | 5/2016 |
| JP | 2016-184476 | A | 10/2016 |
| JP | 2016-220310 | A | 12/2016 |
| JP | 2019-001305 | A | 1/2019 |
| JP | 2019-062712 | A | 4/2019 |
| JP | 2020-013726 | A | 1/2020 |
| JP | 2020-120566 | A | 8/2020 |
| KR | 2013-0061437 | A | 6/2013 |

OTHER PUBLICATIONS

Written Opinion (Application No. PCT/IB2021/057029) Dated Oct. 26, 2021 .
Zhang.J et al., "Trace doping of multiple elements enables stable battery cycling of LiCoO2 at 4.6 V", Nature Energy, Jun. 17, 2019, vol. 4, pp. 594-603.
Hirooka.M et al., "Improvement of float charge durability for LiCoO2 electrodes under high voltage and storage temperature by suppressing O1-Phase transition", Journal of Power Sources, Jul. 1, 2020, vol. 463, pp. 228127-1-228127-8, Elsevier.
Wang.L et al., "A Novel Bifunctional Self-Stabilized Strategy Enabling 4.6 V LiCoO2 with Excellent Long-Term Cyclability and High-Rate Capability", Adv. Sci. (Advanced Science), Apr. 24, 2019, vol. 6, No. 12, pp. 1900355-1-1900355-11.
Okumura. T et al., "Correlation of lithium ion distribution and X-ray absorption near-edge structure in O3- and O2-lithium cobalt oxides from first-principle calculation", J. Mater. Chem. (Journal of Materials Chemistry), 2012, vol. 22, pp. 17340-17348.
Yano.A et al., "LiCoO2 Degradation Behavior in the High-Voltage Phase Transition Region and Improved Reversibility with Surface Coating", J. Electrochem. Soc. (Journal of the Electrochemical Society), Nov. 12, 2016, vol. 164, No. 1, pp. A6116-A6122.
Wang.Z et al., "EELS analysis of cation valence states and oxygen vacancies in magnetic oxides", Micron, Oct. 1, 2000, vol. 31, No. 5, pp. 571-580, Elsevier.
Chung.K et al., "Structural Studies on the Effects of ZrO2 Coating on LiCoO2 during Cycling Using In Situ X-Ray Diffraction Technique", J. Electrochem. Soc. (Journal of the Electrochemical Society), Sep. 20, 2006, vol. 153, No. 11, pp. A2152-A2157.
Chen.Z et al., "Staging Phase Transitions in LixCoO2", J. Electrochem. Soc. (Journal of the Electrochemical Society), Oct. 29, 2002, vol. 149, No. 12, pp. A1604-A1609.
Ohzuku.T et al., "Solid-State Redox Reactions of LiCoO2 (R-3m) for 4 Volt Secondary Lithium Cells", J. Electrochem. Soc. (Journal of the Electrochemical Society), Nov. 1, 1994, vol. 141, No. 11, pp. 2972-2977.
Zou.M et al., "Synthesis and Electrochemical Performance of High Voltage Cycling LiM0.05Co0.95O2 as Cathode Material for Lithium Rechargeable Cells", Electrochemical and Solid-State Letters, Apr. 26, 2004, vol. 7, No. 7, pp. A176-A179.
Kim.Y et al., "Suppression of Cobalt Dissolution from the LiCoO2 Cathodes with Various Metal-Oxide Coatings", J. Electrochem. Soc. (Journal of the Electrochemical Society), Nov. 5, 2003, vol. 150, No. 12, pp. A1723-A1725.

(56) References Cited

OTHER PUBLICATIONS

Liu.A et al., "Synthesis of Mg and Mn Doped LiCoO2 and Effects on High Voltage Cycling", J. Electrochem. Soc. (Journal of the Electrochemical Society), Jun. 2, 2017, vol. 164, No. 7, pp. A1655-A1664.
Shim.J et al., "Effects of MgO Coating on the Structural and Electrochemical Characteristics of LiCoO2 as Cathode Materials for Lithium Ion Battery", Chem. Mater. (Chemistry of Materials), Mar. 24, 2014, vol. 26, No. 8, pp. 2537-2543.
Wang.Z et al., "Mg doping and zirconium oxyfluoride coating co-modification to enhance the high-voltage performance of LiCoO2 for lithium ion battery", Journal of Alloys and Compounds, Oct. 5, 2014, vol. 621, pp. 212-219.
Shim.J et al., "Synergistic effects of coating and doping for lithium ion battery cathode materials: synthesis and characterization of lithium titanate-coated LiCoO2 with Mg doping", Electrochimica Acta, Nov. 11, 2015, vol. 186, pp. 201-208, Elsevier.
Taguchi.N et al., "Characterization of MgO-coated-LiCoO2 particles by analytical transmission electron microscopy", Journal of Power Sources, Aug. 10, 2016, vol. 328, pp. 161-166, Elsevier.
Amatucci.G et al., "CoO2, The End Member of the LixCoO2 Solid Solution", J. Electrochem. Soc. (Journal of the Electrochemical Society), Mar. 1, 1996, vol. 143, No. 3, pp. 1114-1123.
Qian.J et al., "Electrochemical surface passivation of LiCoO2 particles at ultrahigh voltage and its applications in lithium-based batteries", Nature Communications, Nov. 21, 2018, vol. 9, pp. 4918-1-4918-11.
Yin.R et al., "In Situ XRD Investigation and Thermal Properties of Mg Doped LiCoO2 for Lithium Ion Batteries", J. Electrochem. Soc. (Journal of the Electrochemical Society), Jan. 3, 2012, vol. 159, No. 3, pp. A253-A258.
Shao-horn.Y et al., "Probing Lithium and Vacancy Ordering in O3 Layered Lix CoO2 (x=0.5) : An Electron Diffraction Study", J. Electrochem. Soc. (Journal of the Electrochemical Society), Feb. 6, 2003, vol. 150, No. 3, pp. A366-A373.
Kalluri.S et al., "Surface Engineering Strategies of Layered LiCoO2 Cathode Material to Realize High-Energy and High-Voltage Li-Ion Cells", Advanced Energy Materials, Oct. 12, 2016, vol. 7, No. 1, pp. 1601507-1-1601507-21.
Zhang.S et al., "Surface engineering of LiCoO2 by a multifunctional nanoshell for stable 4.6V electrochemical performance", Energy Storage Materials, Feb. 21, 2023, vol. 57, pp. 289-298.
Yano.A et al., "Capability and Reversibility of LiCoO2 during Charge/Discharge with O3/H1-3 Layered Structure Change", J. Electrochem. Soc. (Journal of the Electrochemical Society), May 11, 2021, vol. 168, No. 5, pp. 050517-1-050517-11.

* cited by examiner

CONTROL SYSTEM FOR SECONDARY BATTERY

CROSS REFERENCE TO RELATED APPLICATIONS

This application is a U.S. National Phase Application under 35 U.S.C. § 371 of International Application PCT/IB2021/057029, filed on Aug. 2, 2021, which is incorporated by reference and claims the benefit of a foreign priority application filed in Japan on Aug. 12, 2020, as Application No. 2020-136440.

TECHNICAL FIELD

One embodiment of the present invention relates to a control system for a secondary battery.

Note that one embodiment of the present invention is not limited to the above technical field. The technical field of the invention disclosed in this specification and the like relates to an object, a method, or a manufacturing method. One embodiment of the present invention relates to a process, a machine, manufacture, or a composition of matter. Thus, more specifically, examples of the technical field of one embodiment of the present invention disclosed in this specification include a semiconductor device, a display device, a light-emitting device, a power storage device, an imaging device, a memory device, a driving method thereof, and a manufacturing method thereof.

Note that in this specification, a power storage device generally refers to an element and a device having a function of storing power. For example, a power storage device (also referred to as a secondary battery or a battery) such as a lithium-ion secondary battery, a lithium-ion capacitor, and an electric double layer capacitor are included.

BACKGROUND ART

In recent years, a variety of power storage devices such as lithium-ion secondary batteries, lithium-ion capacitors, and air batteries have been actively developed. In particular, demand for lithium-ion secondary batteries with high output and high energy density has rapidly grown with the development of the semiconductor industry, for portable information terminals such as mobile phones, smartphones, and laptop computers, portable music players, digital cameras, medical equipment, next-generation clean energy vehicles such as hybrid electric vehicles (HVs), electric vehicles (EVs), and plug-in hybrid electric vehicles (PHVs), and the like, and the lithium-ion secondary batteries are essential as rechargeable energy supply sources for today's information society.

A lithium-ion secondary battery has a problem in charging and discharging at low temperatures or high temperatures. Under low temperatures below freezing, in particular, a secondary battery has a difficulty in exhibiting sufficient performance because it is a power storage means utilizing a chemical reaction. Moreover, at high temperatures, the lifetime of a lithium-ion secondary battery may be shorter and abnormality might occur.

A secondary battery that can exhibit stable performance regardless of the operation environment has been needed. Patent Document 1 discloses, for example, a secondary battery module in which a partition is provided between unit battery cells and temperature control with the use of a PTC (positive temperature coefficient) heater is carried out through the inlet and outlet of a heating medium.

REFERENCE

Patent Document

[Patent Document 1] Japanese Published Patent Application No. 2006-269426

SUMMARY OF THE INVENTION

Problems to be Solved by the Invention

In the case where a secondary battery is charged rapidly (rapid charging), it is preferable to set beforehand the temperature of the secondary battery in an appropriate temperature range. Temperature control of the secondary battery enables the secondary battery to be charged rapidly at a charging station or the like without any inconvenience. However, in the case where the temperature range of the secondary battery is to be constantly controlled in a temperature range appropriate for rapid charging, electric power of the secondary battery is consumed for a purpose other than driving a power unit or the like.

In addition, in the case where the temperature of the secondary battery is kept in an appropriate temperature range at a charging station, if temperature control is performed using the electric power of the secondary battery, the electric power of the secondary battery is consumed for a purpose other than driving a power unit or the like. In the case where electric power is fed to the secondary battery by wireless power feeding or the like, electric power supply from the outside stops once charging of the secondary battery is completed; thus, electric power of the secondary battery is used for temperature control, which means that electric power of the secondary battery is consumed for a purpose other than driving a power unit or the like.

An object of one embodiment of the present invention is to provide a secondary battery control system or the like with a novel structure, which can reduce electric power of a secondary battery that is consumed for a purpose other than driving a power unit or the like, when the temperature of the secondary battery is set in a temperature range suitable for a certain objective. Another object of one embodiment of the present invention is to provide a secondary battery control system or the like with a novel structure, which can control the temperature of a secondary battery without consuming electric power of the secondary battery even after charging of the secondary battery, by means of wireless power feeding or the like, is completed. Another object of one embodiment of the present invention is to provide a secondary battery control system or the like with a novel structure.

Note that the objects of one embodiment of the present invention are not limited to the objects listed above. The objects listed above do not preclude the existence of other objects. Note that the other objects are objects that are not described in this section and will be described below. The objects that are not described in this section will be derived from the description of the specification, the drawings, and the like and can be extracted as appropriate from the description by those skilled in the art. Note that one embodiment of the present invention is to solve at least one of the objects listed above and/or the other objects.

Means for Solving the Problems

One embodiment of the present invention is a control system for a secondary battery in a vehicle including a first secondary battery, a second secondary battery, a first temperature control unit, a secondary battery monitoring unit, and an arithmetic unit, in which the secondary battery monitoring unit acquires remaining amount data of the first secondary battery, the arithmetic unit compares the remaining amount data and a set value, the secondary battery monitoring unit acquires the temperature of the first secondary battery in the case where the remaining amount data is smaller than the set value, the arithmetic unit calculates an adjustment term required to adjust the temperature of the first secondary battery to a set temperature, the arithmetic unit calculates an arrival term required to get to a set charging station, and the first temperature control unit starts adjusting the temperature of the first secondary battery to the set temperature, with electric power fed from the second secondary battery, in the case where the adjustment term is shorter than or equal to the arrival term.

One embodiment of the present invention is a control system for a secondary battery in a vehicle including a first secondary battery, a second secondary battery, a first temperature control unit, a secondary battery monitoring unit, and an arithmetic unit, in which the secondary battery monitoring unit acquires remaining amount data of the first secondary battery, the arithmetic unit compares the remaining amount data and a set value, the secondary battery monitoring unit acquires a temperature of the first secondary battery in the case where the remaining amount data is smaller than the set value, the arithmetic unit calculates an adjustment term required to adjust the temperature of the first secondary battery to a set temperature, the arithmetic unit calculates an arrival term required to get to a set charging station on the basis of map information with position information of the vehicle and position information of the charging station, and the first temperature control unit starts adjusting the temperature of the first secondary battery to the set temperature, with electric power fed from the second secondary battery, in the case where the adjustment term is shorter than or equal to the arrival term.

In one embodiment of the present invention, the control system for a secondary battery with the vehicle including a charging circuit for charging the first secondary battery and the second secondary battery by wireless power feeding and a second temperature control unit, the charging station including a power feeding coil for feeding electric power to the charging circuit, and the second temperature control unit performing adjustment of the temperature of the first secondary battery to the set temperature, with electric power fed from the power feeding coil, is preferable.

In one embodiment of the present invention, the control system for a secondary battery with the first secondary battery and the second secondary battery being each a lithium-ion secondary battery, the first secondary battery being a lithium-ion secondary battery whose operating temperature range is a first temperature range, and the second secondary battery being a lithium-ion secondary battery whose operating temperature range is a second temperature range including an upper limit of the first temperature range is preferable.

In one embodiment of the present invention, the control system for a secondary battery in which a lower limit of the second temperature range is at least lower than 25° C. and the upper limit of the first temperature range is at least higher than the second temperature range is preferable.

In one embodiment of the present invention, the control system for a secondary battery in which a viscosity of an electrolyte in the first secondary battery is lower than a viscosity of an electrolyte in the second secondary battery is preferable.

Note that other embodiments of the present invention will be shown in the following "Mode for Carrying out the Invention" and the "drawings".

Effect of the Invention

One embodiment of the present invention can provide a secondary battery control system or the like with a novel structure, which can reduce electric power of a secondary battery that is consumed for a purpose other than driving a power unit or the like, when the temperature of the secondary battery is set in a temperature range suitable for a certain objective. Another embodiment of the present invention can provide a secondary battery control system or the like with a novel structure, which can control the temperature of a secondary battery without consuming electric power of the secondary battery even after charging of the secondary battery, by means of wireless power feeding or the like, is completed. Another embodiment of the present invention can provide a secondary battery control system or the like with a novel structure.

Note that the effects of one embodiment of the present invention are not limited to the effects listed above. The effects listed above do not preclude the existence of other effects. Note that the other effects are effects that are not described in this section and will be described below. The effects that are not described in this section will be derived from the description of the specification, the drawings, and the like and can be extracted as appropriate from the description by those skilled in the art. Note that one embodiment of the present invention is to have at least one of the effects listed above and/or the other effects. Accordingly, depending on the case, one embodiment of the present invention does not have the effects listed above in some cases.

MODE FOR CARRYING OUT THE INVENTION

Figure 1:
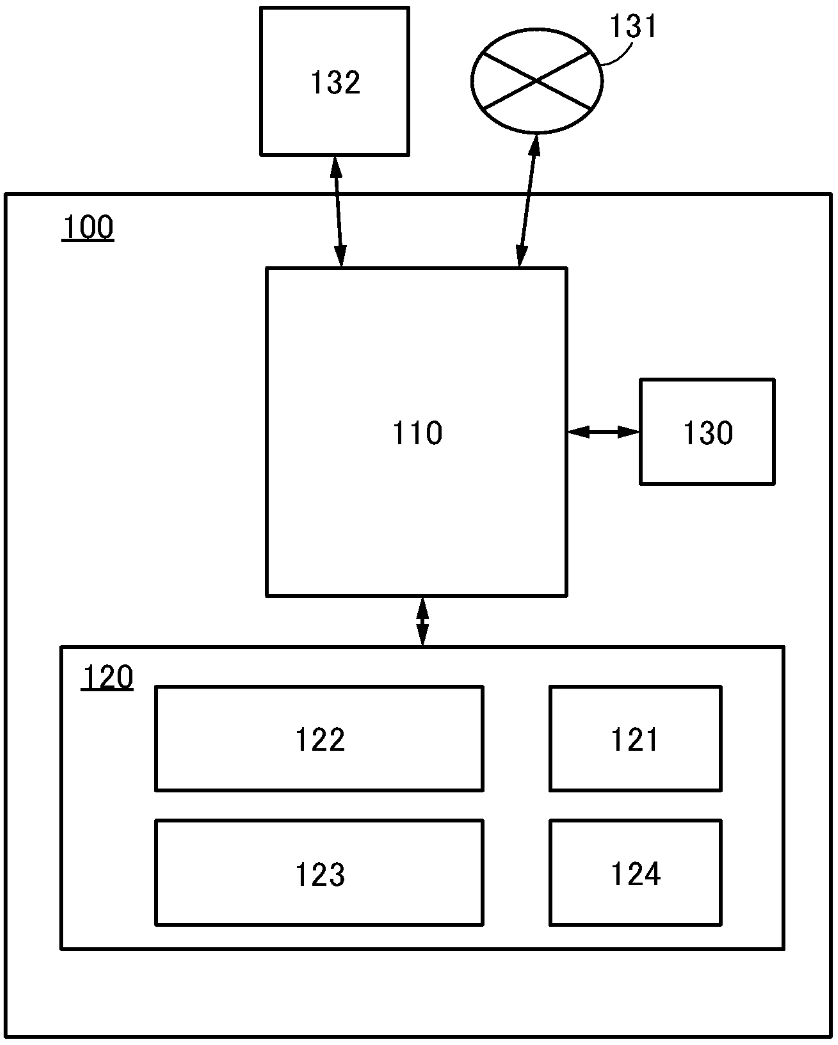
FIG. 1 is a block diagram illustrating one embodiment of the present invention.

Hereinafter, embodiments of the present invention will be described with reference to drawings. However, the embodiments of the present invention can be implemented with many different modes, and it will be readily appreciated by those skilled in the art that modes and details thereof can be changed in various ways without departing from the spirit and scope thereof. Thus, the present invention should not be interpreted as being limited to the following description.

Note that ordinal numbers such as "first", "second", and "third" in this specification and the like are used in order to avoid confusion among components. Thus, the terms do not limit the number of components. Furthermore, the terms do not limit the order of components.

Note that in the drawings, the same elements, elements having similar functions, elements formed of the same material, elements formed at the same time, or the like are sometimes denoted by the same reference numerals, and repeated description thereof is omitted in some cases.

Embodiment 1

In this embodiment, a secondary battery control system capable of reducing electric power of a secondary battery consumed for a purpose other than driving a power unit or the like, when the temperature of the secondary battery is set in a temperature range suitable for a certain objective, will be described.

FIG. 1 is a block diagram for illustrating the secondary battery control system of one embodiment of the present invention. The secondary battery control system is effective in vehicles such as moving objects powered by electric power (also referred to as electric vehicles).

FIG. 1 illustrates a secondary battery control system 100. The secondary battery control system 100 includes an arithmetic unit 110, a secondary battery unit 120, and a data storage unit 130. The secondary battery unit 120 includes a secondary battery monitoring unit 121, a secondary battery 122, a secondary battery 123, and a temperature control unit 124. FIG. 1 also illustrates a network unit 131, which transmits/receives data to/from the arithmetic unit 110, and a position detection unit 132.

The arithmetic unit 110 has a function of controlling the secondary battery unit 120 in order to perform rapid charging of the secondary battery 122 at a facility where charging is available (charging station). Specifically, the arithmetic unit 110 has a function of setting time to start the temperature control for performing rapid charging of the secondary battery 122, on the basis of time taken to get to the charging station and the condition of the secondary battery unit 120.

The time to start the temperature control for performing rapid charging of the secondary battery 122 is set on the basis of a period ($P_{BT1}$) required to reach the set temperature for performing rapid charging by controlling the temperature of the secondary battery unit 120 and a period ($P_{CP}$) required to get to the charging station from the current position. For example, the temperature control of the secondary battery unit 120 is set to start from the point where the period ($P_{BT1}$) becomes shorter than or equal to the period ($P_{CP}$). In this manner, a reduction in capacity of the secondary battery 122 can be decreased, as compared with a case where the temperature control for performing rapid charging of the secondary battery 122 is constantly carried out.

The secondary battery monitoring unit 121 included in the secondary battery unit 120 is a circuit for monitoring a capacity of electric energy (also referred to as remaining amount or remaining capacity) of a plurality of secondary batteries such as the secondary battery 122 and the secondary battery 123. Data on the remaining capacity of the secondary battery is also referred to as remaining capacity data or remaining amount data. The secondary battery monitoring unit 121 is also a circuit for monitoring the temperatures of a plurality of secondary batteries such as the secondary battery 122 and the secondary battery 123. Data on the temperature of the secondary battery is also referred to as temperature data. The secondary battery monitoring unit 121 can also function as a cell balancer for a plurality of secondary batteries such as the secondary battery 122 and the secondary battery 123. The cell balancer is a circuit that equalizes voltages between the secondary batteries forming one group.

The secondary battery 122 is a main power supply. The secondary battery 122 is a battery with a large capacity and a wide operating temperature range including high temperatures. The secondary battery 122 is preferably a lithium ion secondary battery. For the secondary battery to have higher voltage and/or a larger capacity, battery units in which a plurality of battery cells are combined are connected in series or in parallel; and 100 or more secondary batteries, or around 6500 secondary batteries, in the case where the number is large, are mounted on a vehicle. Even more secondary batteries are mounted on a heavy vehicle such as a truck or a bus. Although not illustrated, the secondary battery 122 is provided with a sensor or the like for acquiring the remaining capacity data, the temperature data, or the like from the secondary battery monitoring unit 121. Although not illustrated, the secondary battery 122 is provided with a metal pipe or the like for the temperature to be controlled by the temperature control unit 124.

In the secondary battery 122, $LiPF_6$ (lithium hexafluorophosphate) as Li salt, and a mixed solution of diethyl carbonate (DEC) and ethylene carbonate (EC) are used as electrolytes, for example, such that the secondary battery 122 becomes a battery with a wide operating temperature range including high temperatures. Diethyl carbonate (DEC) has a melting point of −43° C., a boiling point of 127° C., and a viscosity of 0.75 cP. A secondary battery that has a high capacity and hardly deteriorates at high temperatures while its characteristics are degraded when used at temperatures below freezing is employed as the secondary battery 122. The electrolytes used in the secondary battery 122 are not limited to the above combination.

The viscosity of an electrolyte used for the secondary battery 122 is preferably lower than the viscosity of an electrolyte used for the secondary battery 123. The viscosity can be measured with a rotational viscometer.

The secondary battery 123 is an auxiliary power supply. The secondary battery 123 is preferably a lithium-ion secondary battery with a smaller capacity, as compared with the secondary battery 122, and a wide operating temperature range including low temperatures. A secondary battery with a wide operating temperature range including low temperatures refers to, for example, a secondary battery whose lower limit of the operating temperature range is higher than or equal to −40° C. and lower than 25° C., preferably higher than or equal to −40° C. and lower than 0° C. Although not illustrated, the secondary battery 123 is provided with a sensor or the like for acquiring the remaining capacity data, temperature data, or the like from the secondary battery monitoring unit 121.

In the secondary battery 123, $LiPF_6$ (lithium hexafluorophosphate) as Li salt, and a mixture of ethylene carbonate (EC) as a cyclic carbonate material and dimethyl carbonate (DMC) or ethyl methyl carbonate (EMC) as a chain carbonate material can be used as electrolytes, such that the secondary battery 123 becomes a battery with a wide operating temperature range including low temperatures. A secondary battery using electrolytes with this combination is confirmed to be able to be charged and discharged at 0.1 C at −40° C. Instead of EC, polypropylene carbonate (PC), fluoroethylene carbonate (FEC), or the like may be used. Such cyclic carbonates may be mixed at a given ratio and used. Alternatively, a semi-solid-state battery or an all-solid-state battery may be used as the secondary battery 123.

Note that ethylene carbonate (EC) has a melting point of 38° C., a boiling point of 238° C., and a viscosity of 1.9 cP (at 40° C.). Dimethyl carbonate (DMC) has a melting point of 3° C., a boiling point of 90° C., and a viscosity of 0.59 cP. Ethyl methyl carbonate (EMC) has a melting point of −54° C., a boiling point of 107° C., and a viscosity of 0.65 cP. Polypropylene carbonate (PC) has a melting point of −50° C., a boiling point of 242° C., and a viscosity of 2.5 cP. Fluoroethylene carbonate (FEC) has a melting point of 17° C. and a boiling point of 210° C. At least one of the main components of an electrolyte layer used for the secondary battery 123 is preferably composed of a component having a melting point lower than or equal to −40° C. The term "main component" refers to a component with 1 wt % or more of the whole electrolyte layer. The composition of a solvent used for the electrolyte layer can be estimated with the use of NMR (nuclear magnetic resonance spectrum), GC-MS (gas chromatography mass spectrometry), or the like. More desirably, at least one electrolyte (also referred to as a solvent or an electrolytic solution) used for the secondary battery 123 is EMC, which has a melting point lower than or equal to −40° C.

Furthermore, an additive such as vinylene carbonate (VC), propane sultone (PS), tert-butylbenzene (TBB), fluoroethylene carbonate (FEC), lithium bis(oxalate)borate (LiBOB), or a dinitrile compound like succinonitrile or adiponitrile may be added to the electrolyte layer. The concentration of the additive in the whole electrolyte is, for example, higher than or equal to 0.1 wt % and lower than or equal to 5 wt %.

Furthermore, the operating temperature range of the secondary battery 123 at least partly overlaps with the operating temperature range of the secondary battery 122.

The temperature control unit 124 has a function of controlling the temperature of the metal pipe for controlling the temperature of the secondary battery 122. The temperature control unit 124 includes, for example, a radiator for lowering the temperature of the secondary battery 122, a heater for raising the temperature of the secondary battery 122, or the like. The temperature control unit 124 can control the temperature of the secondary battery 122 by heating or cooling of the metal pipe in the secondary battery 122. Alternatively, the temperature of the secondary battery 122 may be controlled by heating or cooling of a heating medium in the metal pipe. In that case, the heating medium in the metal pipe may be circulated with a pump or the like.

The network unit 131 accesses a server or the like where data such as map information and charging station information is saved, for example, and obtains necessary data such as map information and charging station information. The necessary data such as map information and charging station information that was obtained can be stored in the data storage unit 130.

The position detection unit 132 receives a signal from the Global Positioning System (GPS), for example, and analyzes it to acquire positional information data. Note that the positional information data includes numerical values of latitude, longitude, and the like.

The data storage unit 130 can store various kinds of data such as remaining capacity data of the secondary battery 122 and a set value of the remaining capacity data that is set in advance, in addition to data such as map information and charging station information. Note that the data storage unit 130 can be integrated with the arithmetic unit 110 or the like.

Arithmetic circuits or memory circuits such as the arithmetic unit 110, the secondary battery monitoring unit 121, the temperature control unit 124, and the data storage unit 130 may be formed using a memory element including an OS transistor. A memory element using an OS transistor can be freely placed by being stacked over a circuit using a Si transistor or the like, which facilitates integration and enables a structure where the data storage unit 130 is stacked over the arithmetic unit 110, for example. Furthermore, an OS transistor can be fabricated with a manufacturing apparatus similar to that for a Si transistor and thus can be fabricated at low cost.

In an OS transistor, a metal oxide functioning as an oxide semiconductor is preferably used for a channel formation region. For example, as the metal oxide, a metal oxide such as an In-M-Zn oxide (the element M is one or more selected from aluminum, gallium, yttrium, copper, vanadium, beryllium, boron, titanium, iron, nickel, germanium, zirconium, molybdenum, lanthanum, cerium, neodymium, hafnium, tantalum, tungsten, magnesium, and the like) is preferably used.

Specifically, as the metal oxide, a metal oxide with In:Ga:Zn=1:3:4 [atomic ratio] or 1:1:0.5 [atomic ratio] is used. As the metal oxide, a metal oxide with In:Ga:Zn=4:2:3 [atomic ratio] or 1:1:1 [atomic ratio] is used. As the metal oxide, a metal oxide with In:Ga:Zn=1:3:4 [atomic ratio], Ga:Zn=2:1 [atomic ratio], or Ga:Zn=2:5 [atomic ratio] is used. Specific examples of the metal oxide having a stacked-layer structure include a stacked-layer structure of In:Ga:Zn=4:2:3 [atomic ratio] and In:Ga:Zn=1:3:4 [atomic ratio], a stacked-layer structure of Ga:Zn=2:1 [atomic ratio] and In:Ga:Zn=4:2:3 [atomic ratio], a stacked-layer structure of Ga:Zn=2:5 [atomic ratio] and In:Ga:Zn=4:2:3 [atomic ratio], and a stacked-layer structure of gallium oxide and In:Ga:Zn=4:2:3 [atomic ratio].

The metal oxide may have crystallinity. For example, a CAAC-OS (c-axis aligned crystalline oxide semiconductor) described later is preferably used. An oxide having crystallinity, such as a CAAC-OS, has a dense structure with small amounts of impurities, defects (e.g., oxygen vacancies), and the like, and high crystallinity. This can inhibit oxygen extraction from the metal oxide by the source electrode or the drain electrode. Oxygen extraction from the metal oxide can be suppressed even when heat treatment is performed; thus, the OS transistor is stable with respect to high temperatures in the manufacturing process (what is called thermal budget).

In the control circuit or protection circuit, with the use of a memory element including an OS transistor, a reference voltage can be retained in the memory element by utilizing an extremely low leakage current flowing between a source and a drain when the transistor is off (hereinafter off-state current). At this time, the memory element can be powered off; thus, with the use of the memory element including the OS transistor, the reference voltage can be retained with extremely low power consumption.

The memory element including the OS transistor can retain an analog potential. For example, a voltage of a secondary battery can be retained in the memory element without being converted to a digital value with an analog-to-digital converter circuit. Since the converter circuit is unnecessary, the circuit area can be reduced.

In addition, the memory element with the OS transistor can rewrite and read the reference voltage by charging or discharging electric charge; thus, a substantially unlimited number of times of acquisition and reading of the monitor voltage is possible. The memory element using the OS transistor is superior in rewrite endurance because, unlike a magnetic memory or a resistive random-access memory, it does not go through atomic-level structure change. Furthermore, unlike in a flash memory, unstableness due to the increase of electron trap centers is not observed in the memory element with the OS transistor even when rewrite operation is repeated.

An OS transistor has features of an extremely low off-state current and favorable switching characteristics even in a high-temperature environment. Accordingly, charging or discharging of a plurality of secondary batteries (assembled battery) can be controlled without a malfunction even in a high-temperature environment.

A memory element with an OS transistor can be freely placed by being stacked over a circuit with a Si transistor or the like, so that integration can be easy. Furthermore, an OS transistor can be fabricated with a manufacturing apparatus similar to that for a Si transistor and thus can be fabricated at low cost.

An OS transistor can be a four-terminal semiconductor element including a back gate electrode in addition to a gate electrode, a source electrode, and a drain electrode. An electric network where input and output of signals flowing between a source and a drain can be independently controlled in accordance with a voltage applied to a gate electrode or a back gate electrode can be constituted. Thus, circuit design with the same ideas as those of an LSI is possible. Furthermore, electrical characteristics of the OS transistor are better than those of a Si transistor in a high-temperature environment. Specifically, the ratio between on-state current and off-state current is large even at a high temperature higher than or equal to 100° C. and lower than or equal to 200° C., preferably higher than or equal to 125° C. and lower than or equal to 150° C.; hence, favorable switching operation can be performed.

Figure 2:
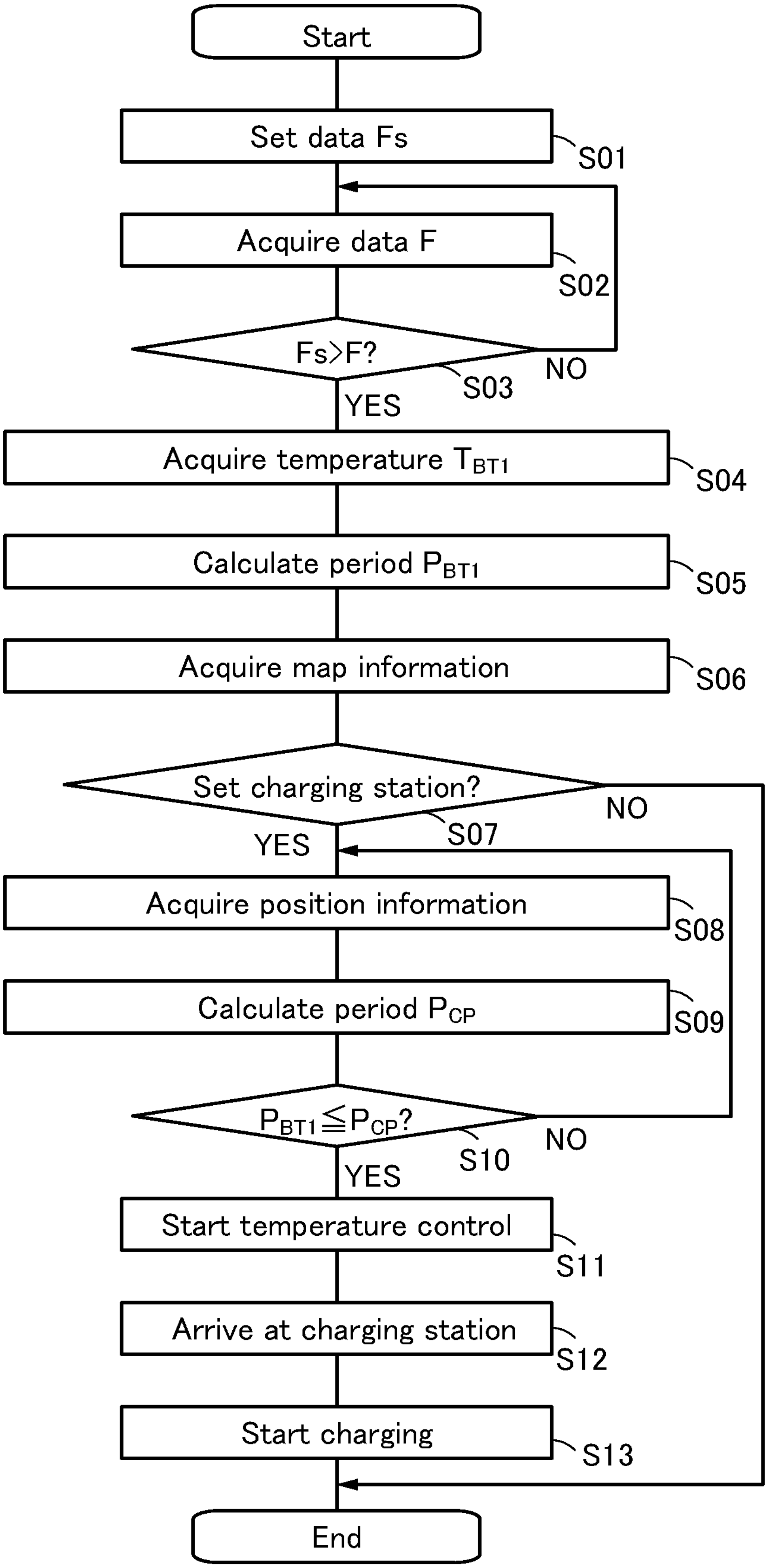
FIG. 2 shows a flow chart illustrating one embodiment of the present invention.

Next, the sequence of the temperature control system of the secondary battery will be described with reference to a flow chart in FIG. 2.

First, a set value $F_S$ of the remaining capacity data of the secondary battery 122 is set (Step S01). The set value corresponds to a value of the remaining capacity data of the secondary battery 122. In the case where the set value is half the remaining capacity data, for example, the set value is 0.5 or 50%. The set value may be a value estimated by arithmetic processing on the basis of an artificial neural network or the like in the arithmetic unit 110, or may be a value set by a user. The set value is stored in the data storage unit 130, and is read out to the arithmetic unit 110 as necessary.

Next, remaining capacity data F of the secondary battery 122 is acquired by the arithmetic unit 110 (Step S02). An interval between acquisitions of the remaining capacity data F can be variable, in accordance with the speed of the vehicle, the ambient temperature, or the like. In the case where the secondary battery 122 corresponds to a plurality of battery cells, a battery unit, or the like, a lower limit or the like can be used as the remaining capacity data F.

Then, the remaining capacity data F is compared to the set value $F_S$ of the remaining capacity data at the arithmetic unit 110 (Step S03). The arithmetic unit 110 makes a judgement in response to the magnitude relationship between the remaining capacity data F and the set value $F_S$ of the remaining capacity data. Although FIG. 2 shows an example in which the set value $F_S$ is judged as being greater than F ($F_S \geq F$), the set value $F_S$ may be greater than or equal to F ($F_S \geq F$). In the case where the set value $F_S$ is less than F, or the set value $F_S$ is less than or equal to F (NO); acquisitions of the remaining capacity data F of the secondary battery 122 are repeated. In the case where the set value $F_S$ is greater than F, or the set value $F_S$ is greater than or equal to F (YES); the step moves to S04.

Then, the arithmetic unit 110 acquires temperature data $T_{BT1}$ of the secondary battery 122 from the secondary battery unit 120 (Step S04). The acquisition of the temperature data $T_{BT1}$ by the arithmetic unit 110 is performed through the secondary battery monitoring unit 121 or the like. In the case where the secondary battery 122 corresponds to a plurality of battery cells, a battery unit, or the like; an upper limit, a lower limit, an average value, or the like of the acquired temperature data can be used as the temperature data $T_{BT1}$.

Next, the arithmetic unit 110 calculates the period $P_{BT1}$ that is required for temperature adjustment suitable for the rapid charging of the secondary battery 122, on the basis of the temperature data $T_{BT1}$ (Step S05). When the temperature data $T_{BT1}$ already falls within a temperature range suitable for the rapid charging of the secondary battery 122, for example, the period $P_{BT1}$ is zero. In the case where the temperature data $T_{BT1}$ is far from the temperature range suitable for the rapid charging of the secondary battery 122 (e.g., by 10° C. or more), for example, the period $P_{BT1}$ increases. In the case where the temperature data $T_{BT1}$ is close to the temperature range suitable for the rapid charging of the secondary battery 122 (e.g., by 5° C. or less), the period $P_{BT1}$ decreases. The calculation of the period $P_{BT1}$ is carried out by the arithmetic unit 110, with the ambient temperature, the position of the secondary battery 122, the traveling speed, or the like being taken into account. It is also possible for the arithmetic unit 110 to infer the period $P_{BT1}$, through operation by an artificial neural network using parameters such as the ambient temperature, the position of the secondary battery 122, the traveling speed, or the like as learning data.

Then, the arithmetic unit 110 acquires map information from the data storage unit 130 (Step S06). With the use of the fifth-generation mobile communication system (5G) as the network unit 131, the map information can be acquired in real time, not depending on information temporarily acquired by the data storage unit 130. In addition to the map information, other information such as traffic information may also be acquired. Note that the map information may include information on charging stations.

Next, a judgment as to whether or not to set a charging station for charging the secondary battery unit 120 is made (Step S07). The charging station may be set through automatic selection of a charging station that is the closest from the current position, or may be set by a user. In the case where setting of the charging station is performed (YES), the step moves to S08. In the case where setting of the charging station is not performed (NO), the sequence of the secondary battery temperature control system is terminated. The case where setting of the charging station is not performed may be automatically selected in the case where the charging station is not set for a predetermined period of time, for example, or may be set by a user.

Then, the arithmetic unit 110 acquires position information from the position detection unit 132 (Step S08). Note that the position information may include information such as a traveling direction of the vehicle.

Then, the arithmetic unit 110 calculates a period $P_{CP}$ required to get to the charging station from the current position, on the basis of the position information, the map information, or the like (Step S09). In the case where the charging station is far (e.g., 1 km or more away) from the current position, for example, the period $P_{CP}$ increases. In the case where the charging station is not far (e.g., within 1 km) from the current position, for example, the period $P_{CP}$ decreases. The calculation of the period $P_{CP}$ is carried out by the arithmetic unit 110, with the directions to the charging station, traffic information, the traveling speed, or the like being taken into account. It is also possible for the arithmetic unit 110 to infer the period $P_{CP}$, through operation by an artificial neural network using parameters such as the directions to the charging station, traffic information, the traveling speed, or the like as learning data.

Next, the period $P_{BT1}$ required for temperature adjustment suitable for the rapid charging of the secondary battery 122 is compared to the period $P_{CP}$ required to get to the charging station from the current position, by the arithmetic unit 110 (Step S10). The arithmetic unit 110 makes a judgment in response to the magnitude relationship between the period $P_{BT1}$ and the period $P_{CP}$. Although FIG. 2 shows an example in which the period $P_{BT1}$ is judged as being shorter than or equal to the period $P_{CP}$ ($P_{BT1} \leq P_{CP}$), the period $P_{BT1}$ may be shorter than the period $P_{CP}$ ($P_{BT1} < P_{CP}$). In the case where the period $P_{BT1}$ is longer than the period $P_{CP}$, or the period $P_{BT1}$ is longer than or equal to the period $P_{CP}$ (NO); the charging station is far from the current position and thus acquisitions of positional information are repeated. In the case where the period $P_{BT1}$ is shorter than or equal to the period $P_{CP}$, or the period $P_{BT1}$ is shorter than the period $P_{CP}$ (YES); the step moves to S11.

Next, temperature control of the secondary battery 122 in the secondary battery unit 120 starts (Step S11). The temperature control of the secondary battery 122 can be performed by controlling the temperature control unit 124 in the secondary battery unit 120.

Then, the vehicle incorporating the secondary battery control system arrives at the charging station (Step S12). The period $P_{BT1}$ having passed since the start of the temperature adjustment, the temperature of the secondary battery 122 at this time is a temperature suitable for the rapid charging of the secondary battery 122.

Next, the vehicle incorporating the secondary battery control system starts charging at the charging station. Since the secondary battery 122 has reached the temperature suitable for rapid charging, as described above, it can be rapidly charged. The temperature control for the secondary battery 122 to be at the temperature suitable for rapid charging is set on the basis of the period ($P_{BT1}$) required to reach the set temperature for performing rapid charging and the period ($P_{CP}$) required to get to the charging station from the current position; thus, a reduction in capacity of the secondary battery 122 can be decreased, as compared with a case where the temperature control for performing rapid charging of the secondary battery 122 is constantly carried out.

Here, in the flow chart of the secondary battery temperature control system described with reference to FIG. 2, the remaining capacity of the secondary batteries 122 and 123, the temperature change of the secondary battery 122, the period $P_{CP}$, and the like will be described with reference to graphs in FIG. 3A, FIG. 3B, FIG. 4A, and FIG. 4B. FIG. 5 to FIG. 8 are schematic diagrams for illustrating specific examples in the flow chart of the secondary battery temperature control system described with reference to FIG. 2.

Figure 3A:
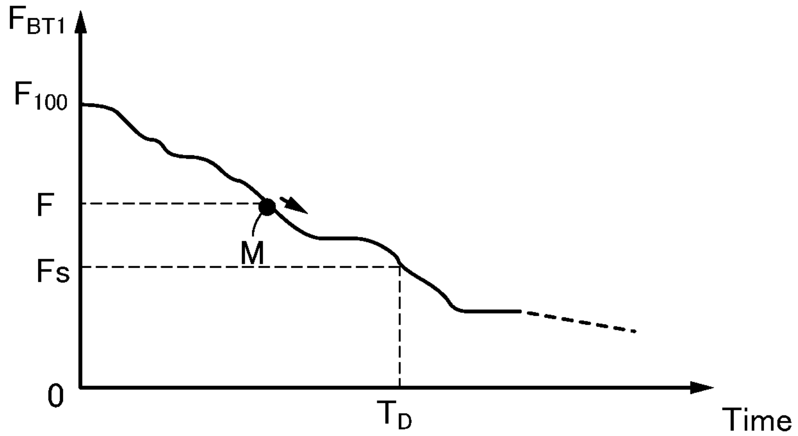
FIG. 3A and FIG. 3B are schematic diagrams each showing one embodiment of the present invention.

FIG. 3A is a graph showing temporal change of the remaining capacity, in which the horizontal axis represents time (Time) and the vertical axis represents the remaining capacity ($F_{BT1}$) of the secondary battery 122. When the remaining capacity of the secondary battery 122 in a fully-charged condition is $F_{100}$, the remaining capacity F decreases due to electric power consumption (indicated by the point M) such as driving. Time at which the remaining capacity becomes the set value $F_S$ is indicated by time $T_D$. The set value $F_S$ corresponds to the set value of the remaining capacity data in Step S01.

Figure 3B:
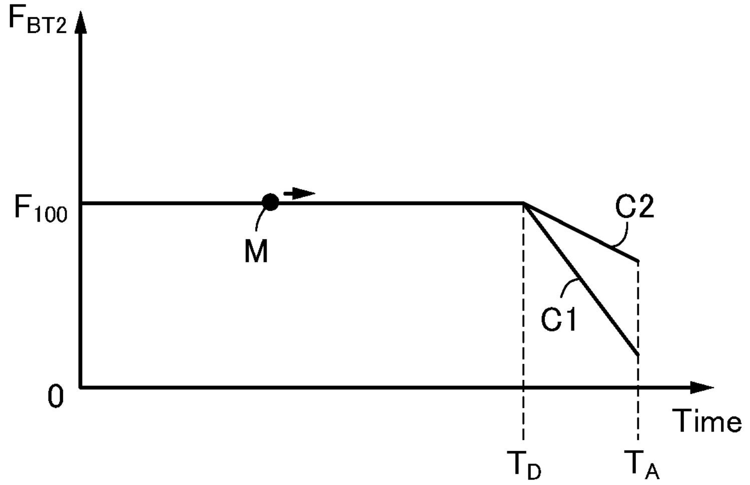

FIG. 3B is a graph showing temporal change of the remaining capacity, in which the horizontal axis represents time and the vertical axis represents the remaining capacity ($F_{BT2}$) of the secondary battery 123. As described above, the capacity of the secondary battery 123 as an auxiliary power supply can be used for the temperature control of the secondary battery 122. In this case, when the remaining capacity in a fully-charged condition is $F_{100}$, the capacity of the secondary battery 123 decreases in a period between time $T_D$ to time TA at when the vehicle arrives at a filling station, with almost no electric power consumption due to driving or the like (indicated by a point M). A change in capacity of the secondary battery 123 depends on the condition of the temperature control of the secondary battery 122; the capacity change is great (C1) in an environment of a cold region, for example, and the capacity change is small (C2) in an environment with a mild weather or the like.

Figure 4A:
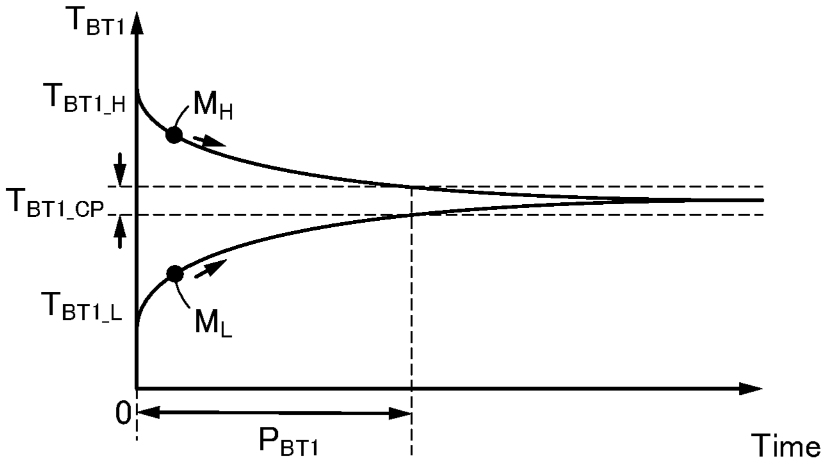
FIG. 4A and FIG. 4B are schematic diagrams each showing one embodiment of the present invention.

FIG. 4A is a graph showing the temporal change in temperature of the secondary battery 122, in which the horizontal axis represents time (Time) and the vertical axis represents the temperature of the secondary battery 122 ($T_{BT1}$). The temperature (temperature range) suitable for rapid charging of the secondary battery 122 is denoted by temperature $T_{BT1\_CP}$. In addition, in advance of the arrival at the charging station, temperature before starting the temperature control of the secondary battery 122 which is higher than the temperature $T_{BT1\_CP}$ is denoted as $T_{BT1\_H}$, and temperature before starting the temperature control of the secondary battery 122 which is lower than the temperature $T_{BT1\_CP}$ is denoted as $T_{BT1\_L}$. The time at which the temperature control of the secondary battery 122 starts in the above-described flow chart in FIG. 2 is 0. The temperature of the secondary battery 122 (denoted by points MH and ML) changes due to the temperature control as time passes, and the temperature of the secondary battery 122 becomes $T_{BT1\_CP}$, which is the temperature suitable for the rapid charging of the secondary battery 122, at a certain time. Time taken for the temperature of the secondary battery 122 to become $T_{BT1\_CP}$, which is the temperature suitable for the rapid charging of the secondary battery 122, is the period $P_{BT1}$. The period $T_{BT1}$ corresponds to the period in Step S05.

Figure 4B:
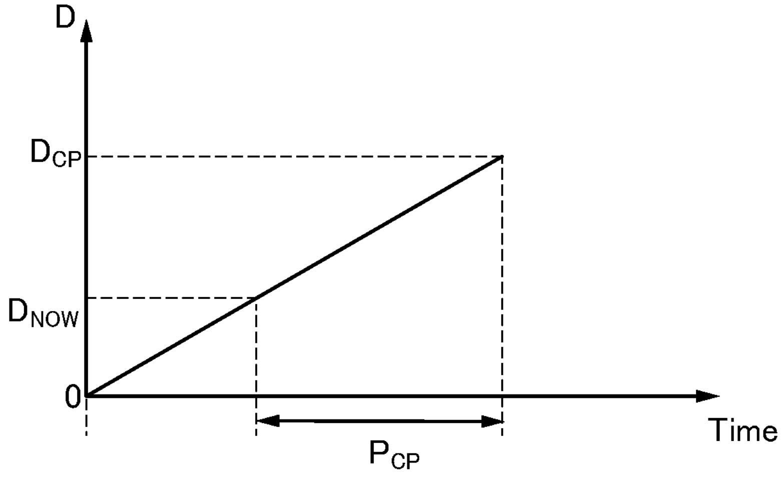

FIG. 4B is a graph in which the horizontal axis represents time and the vertical axis represents the distance between the current position of the vehicle and the charging station. Denoted by $D_{NOW}$ on the vertical axis represents the current position of the vehicle. Denoted by $P_{CP}$ is the charging station. In the case where the vehicle incorporating the secondary battery heads toward the charging station at a certain speed, it requires the period $P_{CP}$. The period $P_{CP}$ corresponds to time required to get to the charging station from the current position. The period $P_{CP}$ corresponds to the period in Step S09.

Figure 5:
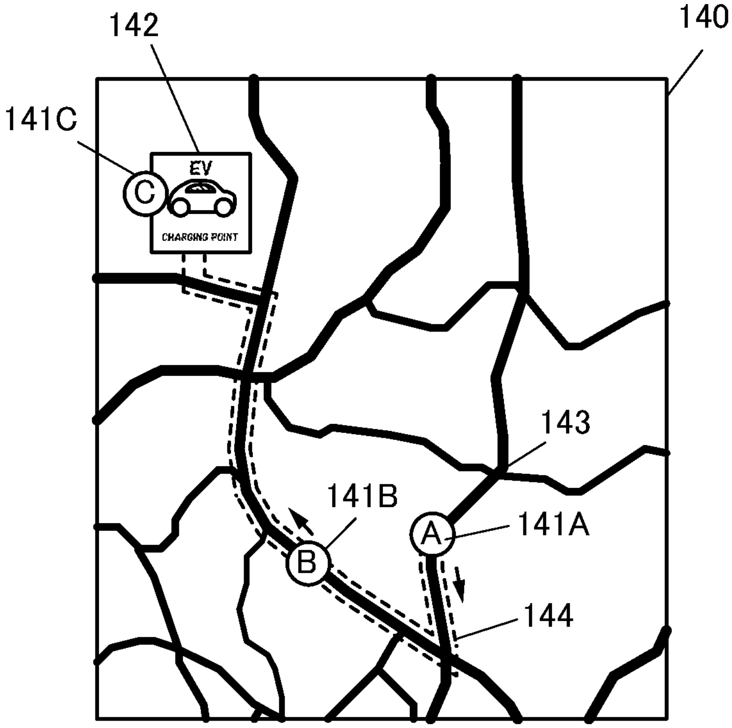
FIG. 5 is a schematic diagram illustrating one embodiment of the present invention.
Figure 6A:
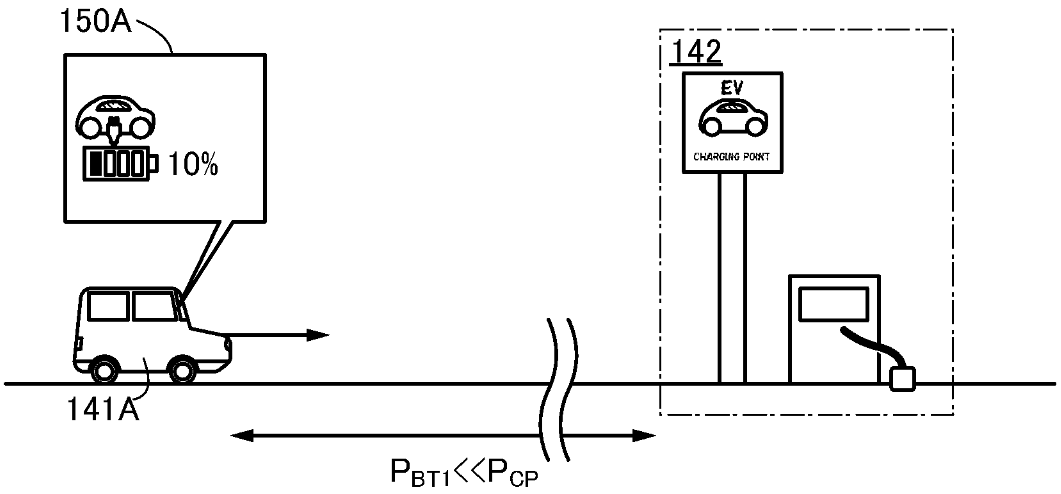
FIG. 6A, FIG. 6B, and FIG. 6C are schematic diagrams each illustrating one embodiment of the present invention.
Figure 6B:
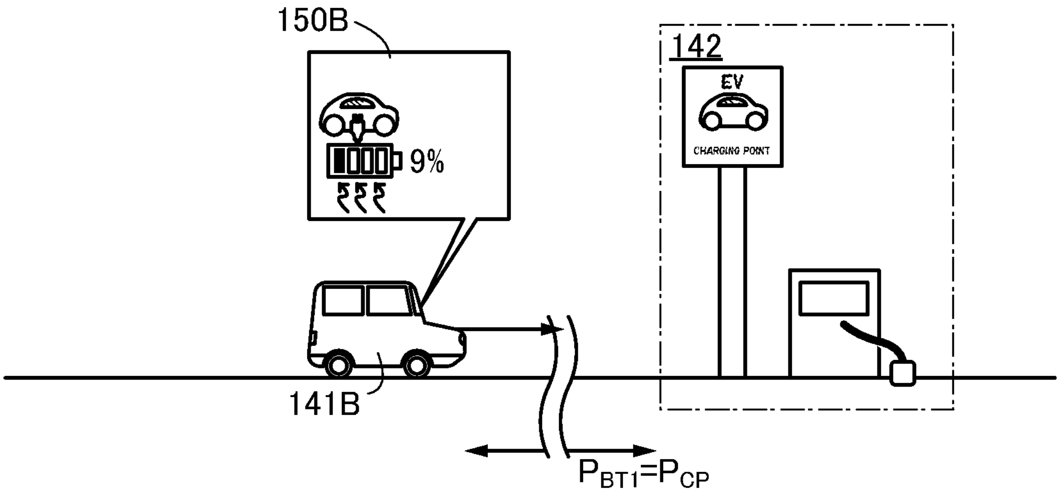
Figure 6C:
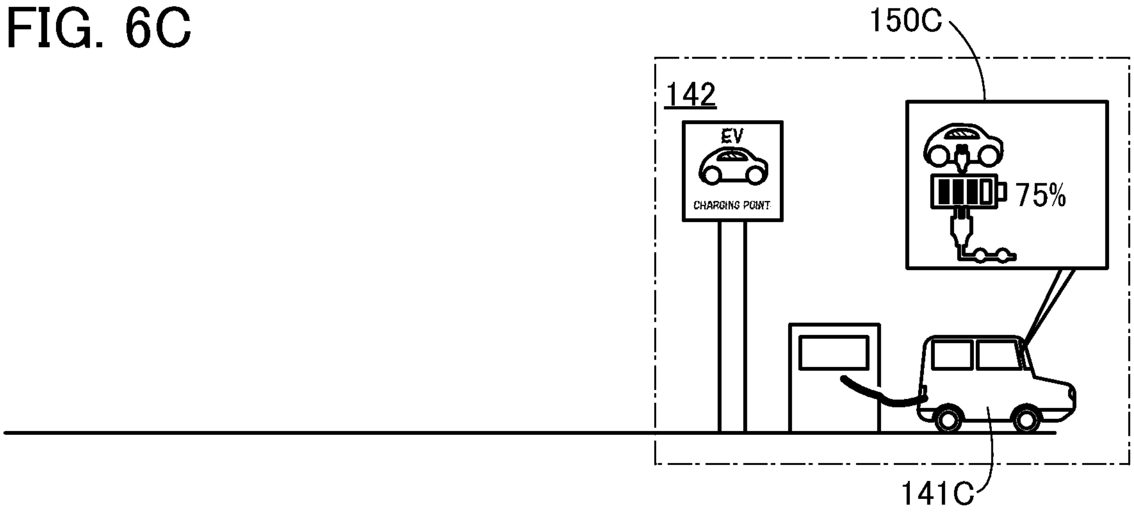

In FIG. 5, a plurality of current positions (a point 141A (point A), a point 141B (point B), and a point 141C (point C); arrows indicate traveling directions), a charging station 142, and a path 144 along a road 143 from each of the current positions to the charging station 142 on map information 140 are shown. FIG. 6A to FIG. 6C each show a charging state of the vehicle at the point 141A (point A), the point 141B (point B), or the point 141C (point C) in FIG. 5, a temperature control condition, the charging station 142, and the time required to get to the charging station 142 from the current position. The description of FIG. 5 is made on the premise that the speed of the vehicle is constant; thus, the distance from each of the current positions to the charging station 142 correlates with the time required to get to the charging station 142 from each of the current positions.

Figure 7:
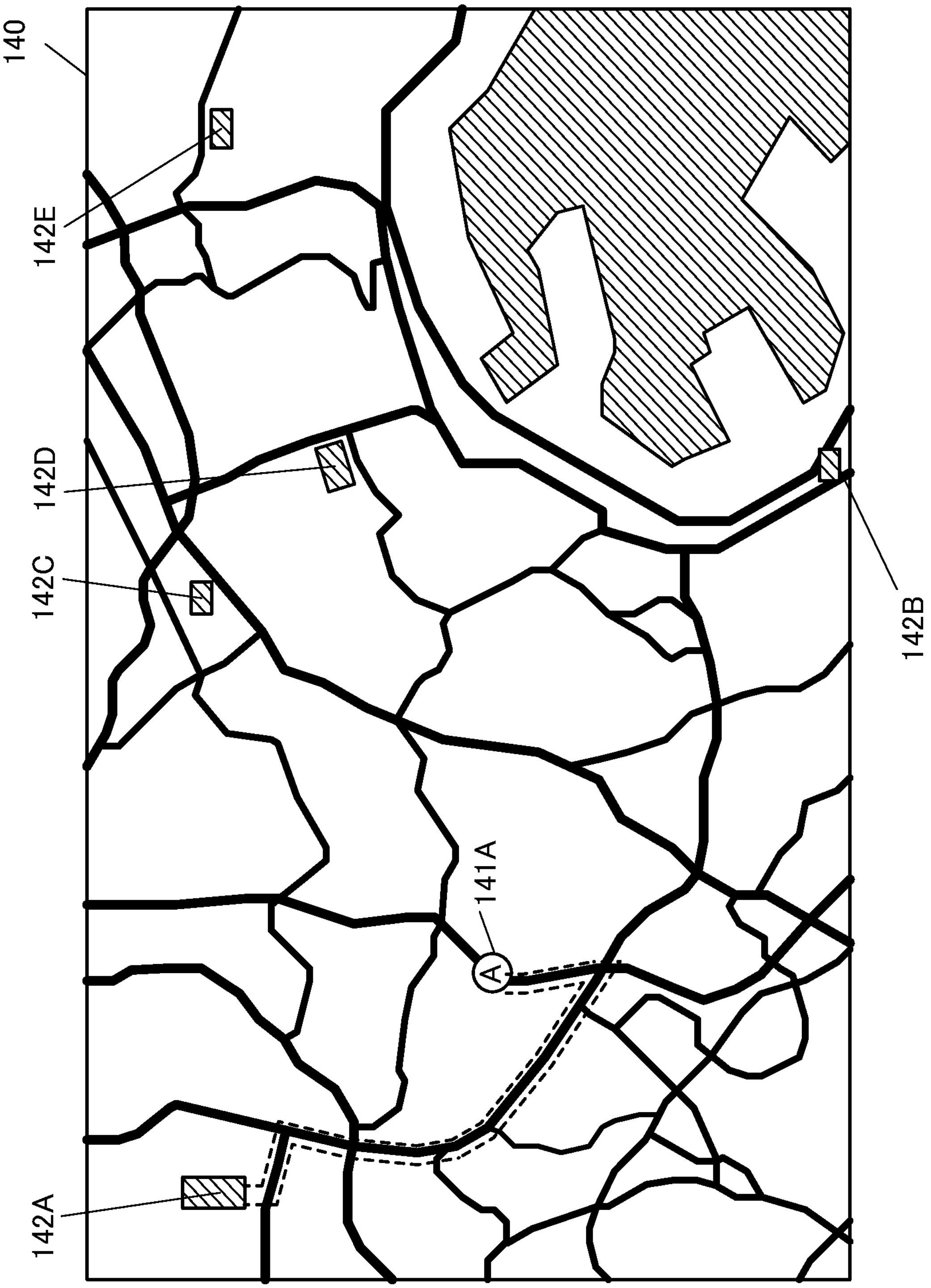
FIG. 7 is a schematic diagram illustrating one embodiment of the present invention.

In the case where there are a plurality of charging stations, such as a charging station 142A to a charging station 142E, on map information 140 as shown in FIG. 7, the charging station 142A which is the closest from the current point 141A (point A) is selected.

The period $P_{CP}$ (distance) required to get to the charging station 142 from the point 141A (point A) is longer than the period $P_{BT1}$ required for the temperature control that is suitable for the rapid charging of the secondary battery 122. In this case, remaining amount data 150A is visualized and shown in the vehicle.

Figure 8A:
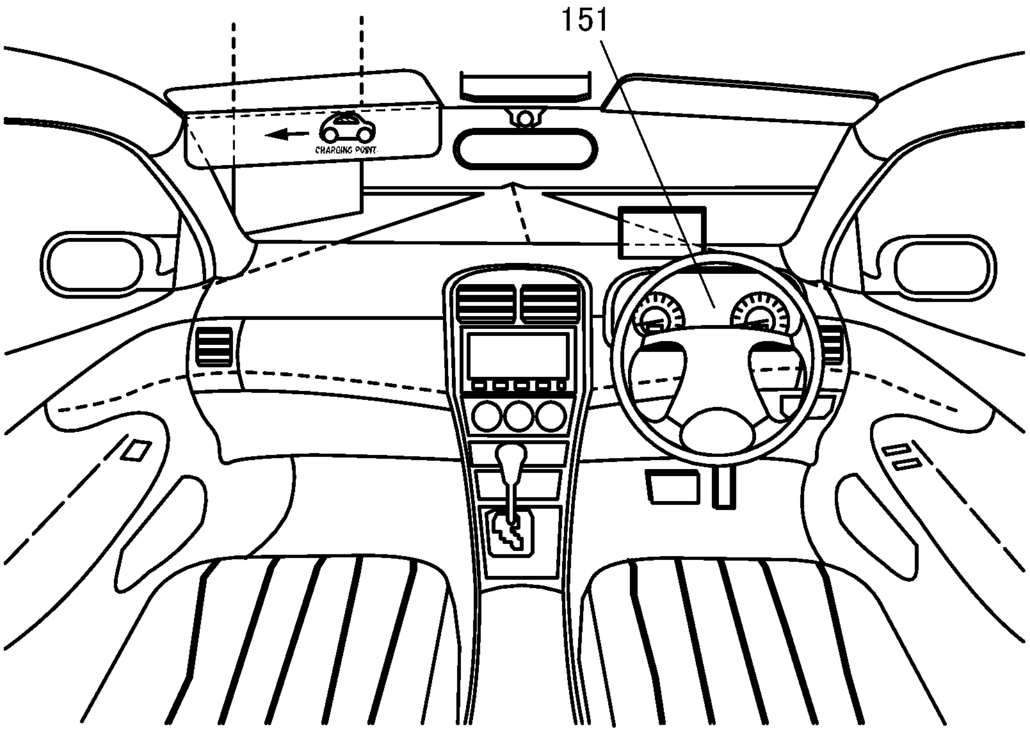
FIG. 8A and FIG. 8B are schematic diagrams each illustrating one embodiment of the present invention.
Figure 8B:
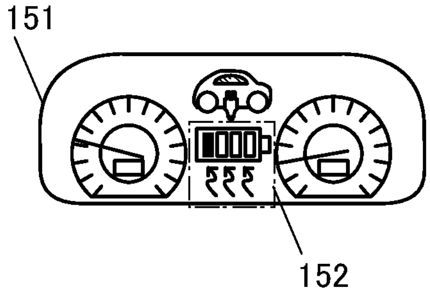

The remaining amount data 150A can be displayed on a panel 151 attached to a dashboard of the vehicle, for example, as shown in FIG. 8A. Specifically, the remaining amount data 150A can be displayed on a highly visible portion like an icon 152 on the panel 151, which displays a tachometer or the like, as shown in FIG. 8B.

The period $P_{CP}$ (distance) required to get to the charging station 142 from the point 141B (point B) is equal to the period $P_{BT1}$ required for the temperature control that is suitable for the rapid charging of the secondary battery 122. In this case, remaining amount data 150B that is visualized and shown is switched to an icon showing the temperature control of the secondary battery 122 and displayed in the vehicle.

The point 141C (point C) is the charging station 142. The secondary battery can be charged rapidly due to the temperature control suitable for rapid charging. Thus, charging of the secondary battery 122 can be started right after the arrival at the charging station 142. In this case, remaining amount data 150C that is visualized and shown is switched to an icon showing rapid charging of the secondary battery 122 and displayed in the vehicle.

In the secondary battery control system of one embodiment of the present invention, which is shown in FIG. 5 to FIG. 8, setting of time to start the temperature control for performing rapid charging of the secondary battery 122 is done on the basis of the period ($P_{BT1}$) required to reach the set temperature for performing rapid charging and the period ($P_{CP}$) required to get to the charging station from the current position. Thus, a reduction in capacity of the secondary battery 122 can be decreased, as compared with the case where the temperature control for performing rapid charging of the secondary battery 122 is constantly performed.

Figure 9A:
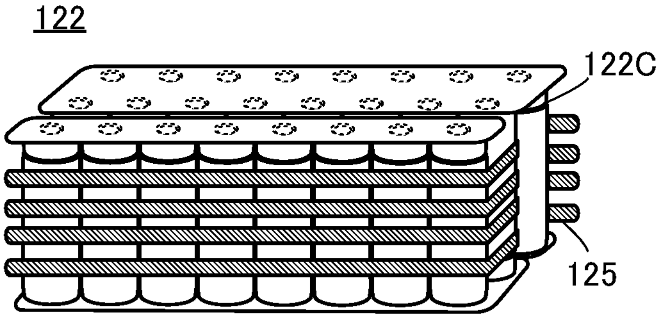
FIG. 9A, FIG. 9B, and FIG. 9C are schematic diagrams each illustrating one embodiment of the present invention.
Figure 9B:
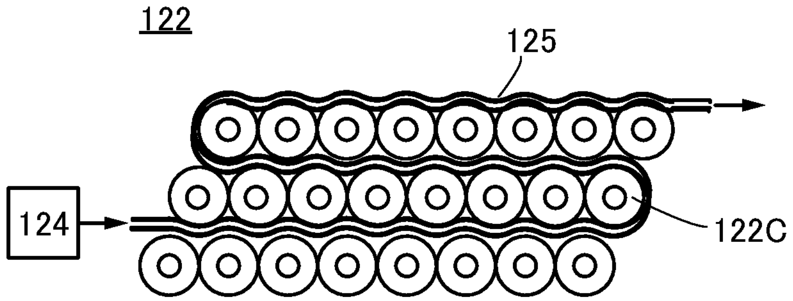
Figure 9C:
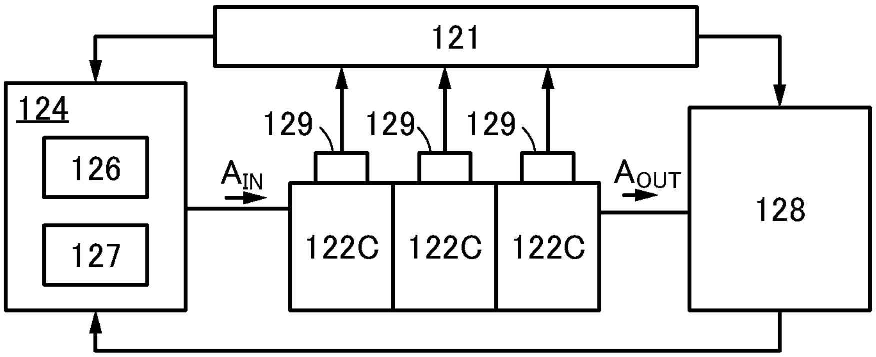

FIG. 9A to FIG. 9C are diagrams for illustrating an example of a structure for performing the temperature control of the secondary battery 122.

FIG. 9A shows a structure example of the secondary battery 122 in which a plurality of battery cells 122C are combined. In the secondary battery 122 shown in FIG. 9A, the plurality of battery cells 122C are sandwiched between conductive plates, and a metal pipe 125 is placed to enclose the battery cells 122C. The plurality of battery cells 122C may be connected in parallel, connected in series, or connected in series after being connected in parallel. With the secondary battery 122 in which the plurality of battery cells 122C are combined, large electric power can be extracted. In addition, placing the metal pipe 125 to enclose the battery cells 122C reduces variations in temperature among the battery cells 122C, and enables the temperature control to be performed through the temperature control unit 124 outside the secondary battery 122.

FIG. 9B is a top view of the secondary battery 122 shown in FIG. 9A. As illustrated in FIG. 9B, the secondary battery 122 is capable of performing temperature control by the heating medium, which has been subjected to heat exchange in the temperature control unit 124, flowing through the metal pipe, or by heat conduction via the metal pipe 125.

FIG. 9C is a diagram illustrating an example of a block diagram in which the heat exchange of the heating medium is performed in the temperature control unit 124 and the temperature control of the secondary battery via the metal pipe is performed. In FIG. 9C, the temperature control unit 124 includes a radiator 126 for lowering the temperature, a heater 127 for raising the temperature, and the like. Each of the battery cells 122C includes a temperature sensor 129 in the example.

The temperature control unit 124 sends a heating medium $A_{IN}$, which has been subjected to temperature control, to the metal pipe. The temperature of the battery cells 122C is controlled by the heating medium in the metal pipe. The heating medium in the metal pipe passes through the temperature control unit 124 again as a heating medium $A_{OUT}$ by a motor 128, thereby being subjected to heat exchange. The temperature data obtained by the temperature sensor 129 is gathered in the secondary battery monitoring unit 121. The secondary battery monitoring unit 121 is capable of controlling the temperature control unit 124 and the motor 128 for circulating the heating medium, in accordance with the temperature data. The heating medium preferably has an insulating property and incombustibility.

Figure 10:
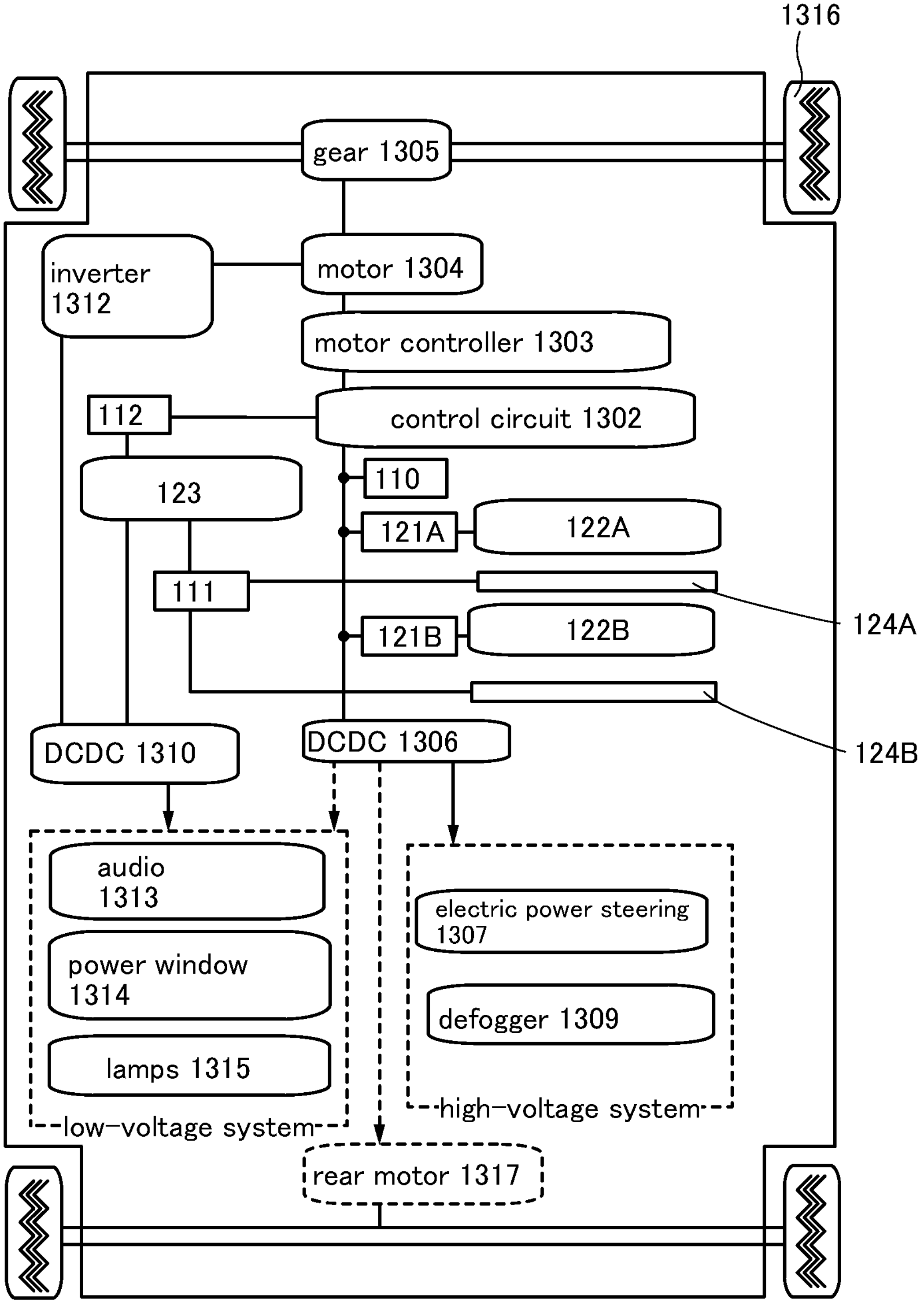
FIG. 10 is a schematic diagram illustrating one embodiment of the present invention.

FIG. 10 is a diagram illustrating an example of a block diagram of the whole vehicle including the secondary battery described above.

In an electric vehicle which is the vehicle illustrated in FIG. 10, the arithmetic unit 110 is shown. In addition, a secondary battery 122A and a secondary battery 122B are shown as the secondary batteries 122. Temperature control units 124A and 124B for controlling the temperature of the secondary battery 122A and the secondary battery 122B, respectively, are shown. Secondary battery monitoring units 121A and 121B for monitoring the temperature and remaining capacity of the secondary battery 122A and the secondary battery 122B, respectively, are shown. FIG. 10 also shows a switch 111 for switching electric power supply from the secondary battery 123 to the temperature control units 124A and 124B. FIG. 10 also shows a secondary battery monitoring unit 112 for monitoring the temperature and remaining capacity of the secondary battery 123.

The switch 111 switches electric power from the secondary battery 123 to enable temperature control of the secondary battery 122A or the secondary battery 122B to be performed.

A control circuit 1302 obtains electric power from any one of the secondary battery 122A, the secondary battery 122B, and the secondary battery 123 and supplies electric power to an inverter 1312, which starts a motor 1304. With such a structure, the secondary battery 123 may function as a cranking battery (also referred to as starter battery) at a low temperature, and the secondary battery 122A or the secondary battery 122B may function as cranking batteries at a high temperature. The motor 1304 is also referred to as an electric motor.

The electric power of the secondary battery 122A or the secondary battery 122B is mainly used to rotate the motor 1304 and supplies electric power to in-vehicle parts for 42 V (such as an electric power steering 1307 and a defogger 1309) through a DC-DC circuit 1306. In the case where there is a rear motor 1317 for the rear wheels, the secondary battery 122A or the secondary battery 122B is used to rotate the rear motor 1317.

The secondary battery 123 may supply electric power not only to the temperature control units 124A and 124B, but also to in-vehicle parts for 14 V (such as an audio 1313, power windows 1314, and lamps 1315) through a DC-DC circuit 1310.

Regenerative energy generated by rolling of tires 1316 is transmitted to the motor 1304 through a gear 1305, and the secondary battery 123 is charged with the energy from a motor controller 1303, the control circuit 1302, or the like through the secondary battery monitoring unit 112. Alternatively, the secondary battery 122A is charged with the energy from the control circuit 1302 through the secondary battery monitoring unit 121A. Alternatively, the secondary battery 122B is charged with the energy from the control circuit 1302 through the secondary battery monitoring unit 121B.

The control circuit 1302 can set charging voltage, charging current, or the like of the secondary battery 122A and the secondary battery 122B. The control circuit 1302 can set the temperatures of the secondary batteries or charging conditions in accordance with the charging characteristics of different secondary batteries, whereby rapid charging can be performed.

Figure 11A:
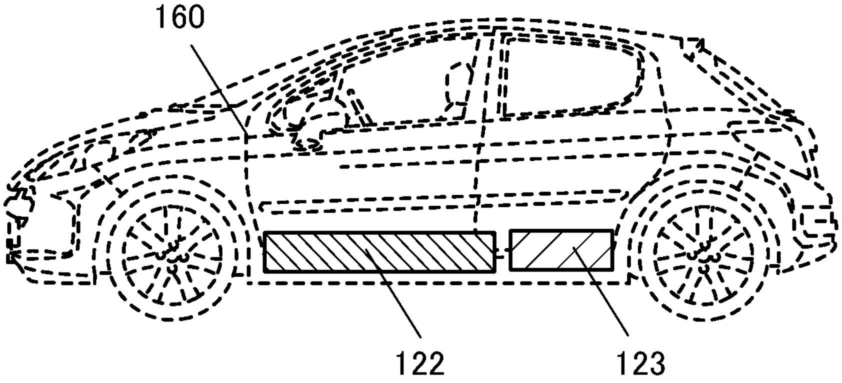
FIG. 11A, FIG. 11B, and FIG. 11C are schematic diagrams each illustrating one embodiment of the present invention.

Note that the secondary battery 122 (the secondary battery 122A and the secondary battery 122B) and the secondary battery 123 can be placed in the electric vehicle as illustrated in FIG. 11A, for example. In FIG. 11A, the secondary battery 122 and the secondary battery 123 placed in a lower part of the interior of an electric vehicle 160 are shown.

Figure 11B:
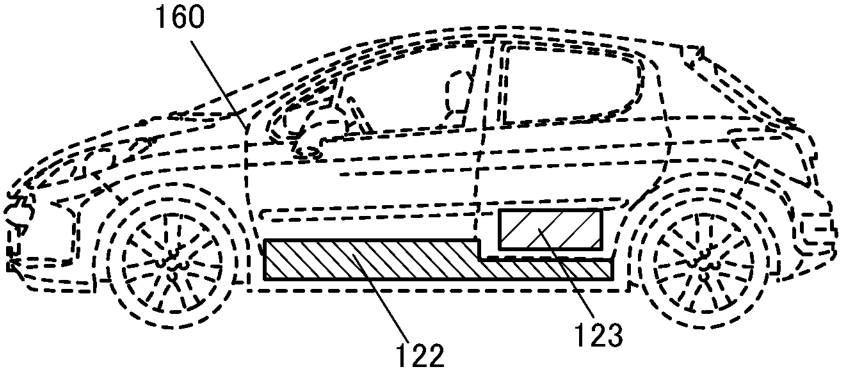

Alternatively, the secondary battery 122 and the secondary battery 123 may be placed to overlap with each other in the lower part of the interior of the electric vehicle 160, as illustrated in FIG. 11B.

Figure 11C:
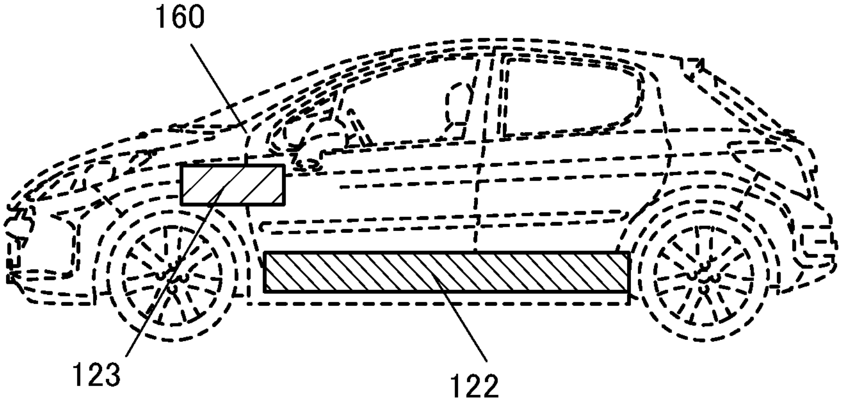

Alternatively, the secondary battery 122 may be placed in the lower part of the interior of the electric vehicle 160 and the secondary battery 123 may be placed in a dashboard, as illustrated in FIG. 11C. Ambient temperature in the dashboard is stable, since it is adjacent to the vehicle interior.

In FIG. 11A to FIG. 11C, the secondary battery 122 is placed under the vehicle interior, i.e., under the car seats, and placed in a position apart from the secondary battery 123. The secondary battery 122 functioning as a main power supply is heavy in weight, and thus is preferably placed under the car interior, when the weight balance of the vehicle is prioritized.

This embodiment can be freely combined with the other embodiments.

Embodiment 2

In one embodiment of the present invention, a secondary battery control system that is capable of performing temperature control of a secondary battery without consuming electric power of the secondary battery even after charging of the secondary battery, by means of wireless power feeding or the like, is completed will be described.

Figure 12A:
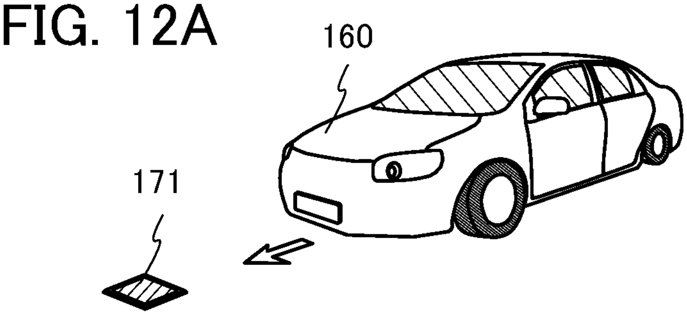
FIG. 12A, FIG. 12B, and FIG. 12C are schematic diagrams each illustrating one embodiment of the present invention.

FIG. 12A illustrates a state where the electric vehicle 160 is approaching a power feeding coil 171 included in a power feeding device. The electric vehicle 160 is approaching the power feeding coil 171 in a direction indicated by an arrow. The power feeding coil 171 is a power supply coil for feeding power to a charging circuit, and is provided at a charging station or the like.

Figure 12B:
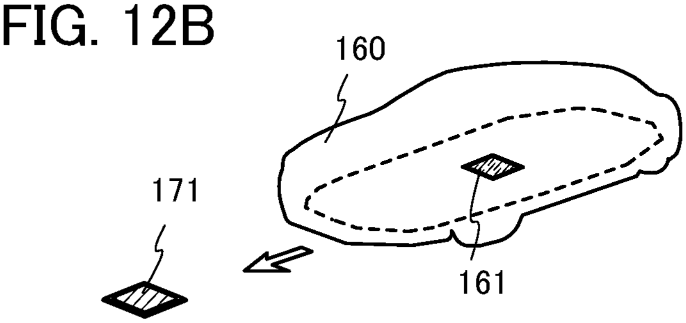

The electric vehicle 160 is provided with a charging circuit 161 on its bottom. It is also possible that the electric vehicle 160 is provided with a plurality of charging circuits 161 on its bottom. In order to clarify the position of the charging circuit 161 in the electric vehicle 160, FIG. 12B shows the electric vehicle 160 with only its contour being drawn and the charging circuit 161 provided on the bottom of the electric vehicle 160.

Figure 12C:
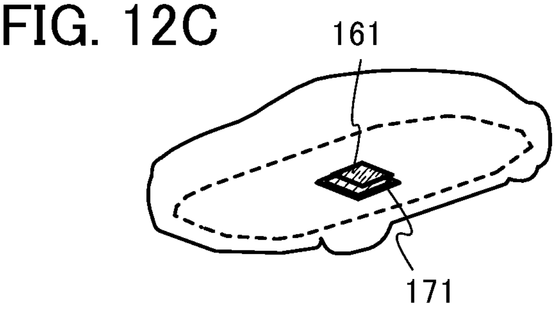

The charging circuit 161 provided on the bottom of the electric vehicle 160 finally becomes adjacent to the power feeding coil 171, as shown in FIG. 12C, as the electric vehicle 160 moves in the direction of the arrow; thereby enabling wireless power feeding.

Figure 13:
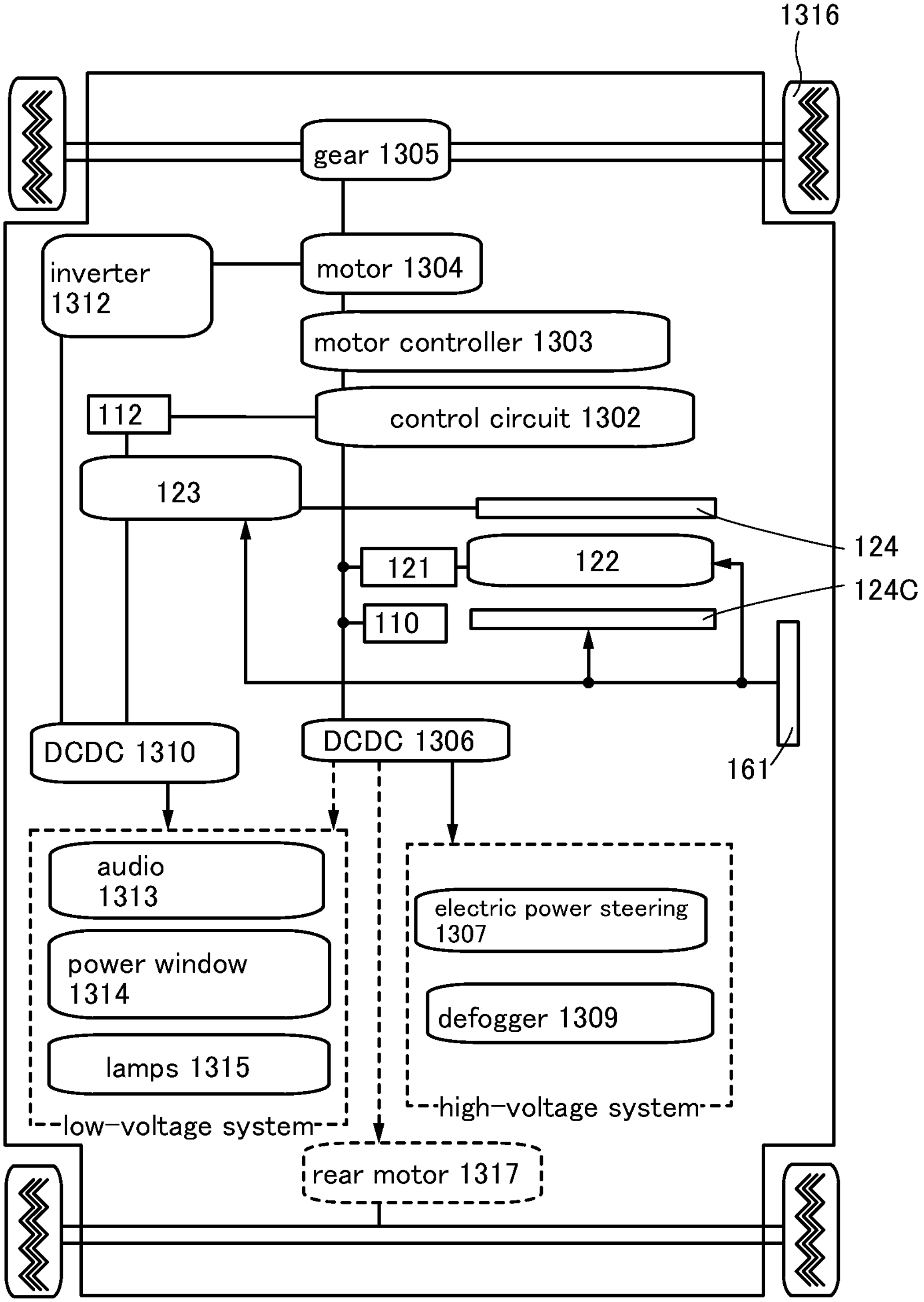
FIG. 13 is a schematic diagram illustrating one embodiment of the present invention.

A modification example of the block diagram of the whole vehicle, which is described above with reference to FIG. 10, as the secondary battery control system of this embodiment is shown in FIG. 13 and will be described. In the description of FIG. 13, points different from those of FIG. 10 will be described and description of the same components will be omitted.

In the block diagram of the whole vehicle shown in FIG. 13, the secondary batteries 122A and 122B in FIG. 10 correspond to the secondary battery 122. In addition, in the block diagram of the whole vehicle shown in FIG. 13, the secondary battery monitoring units 121A and 121B correspond to the secondary battery monitoring unit 121. The switch 111 illustrated in FIG. 10 is omitted in FIG. 13.

In FIG. 13, a temperature control unit 124C that performs temperature control of the secondary battery 122 with electric power from the wireless power feeding, as well as the temperature control unit 124 that performs temperature control of the secondary battery 122 with electric power from the secondary battery 123, is included as a structure for performing temperature control of the secondary battery 122. In addition, FIG. 13 shows the charging circuit 161 as a structure on the vehicle body side for performing wireless power feeding.

Electric power received by the charging circuit 161 is used for, in addition to charging of the secondary battery 122 and the secondary battery 123, the temperature control in the temperature control unit 124C. It is possible that the temperature control unit 124C receives electric power fed from the charging circuit 161 without going through the secondary battery 122 and the secondary battery 123. Thus, temperature adjustment can be continued without consumption of electric power charged in the secondary battery 122 and the secondary battery 123, after charging of the secondary battery 122 and the secondary battery 123 is completed.

Figure 14:
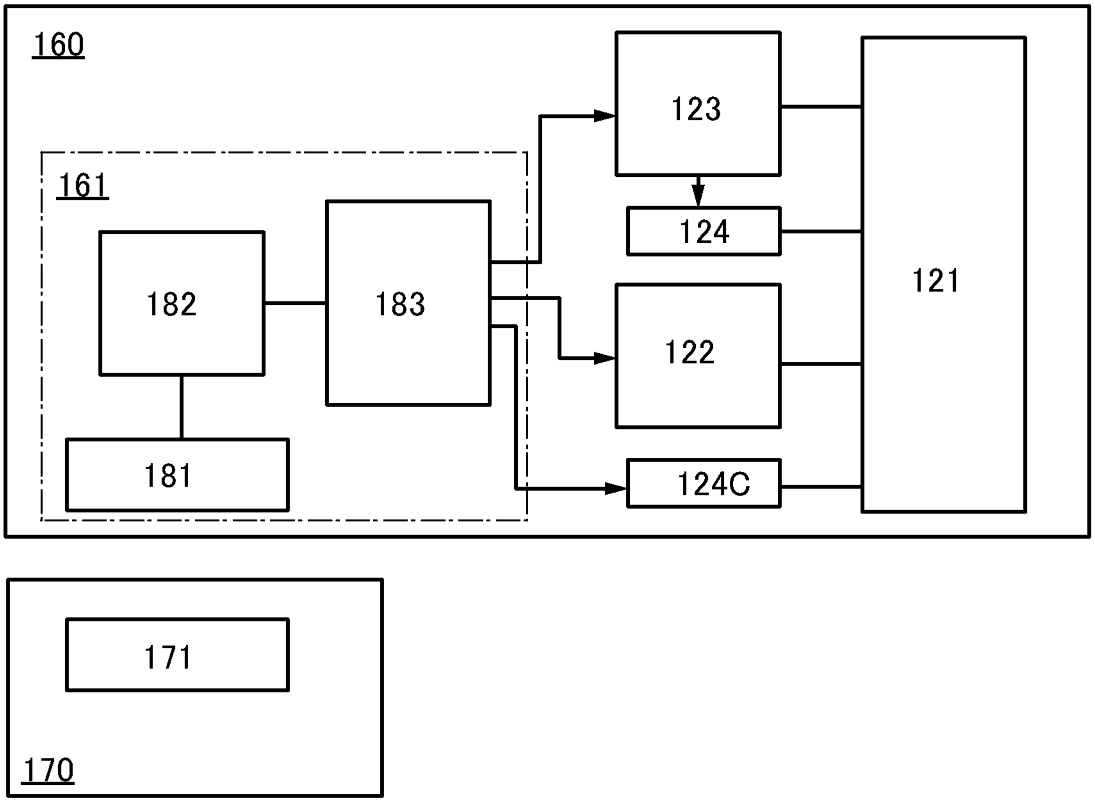
FIG. 14 is a block diagram illustrating one embodiment of the present invention.

FIG. 14 is a block diagram for illustrating a structure example of the charging circuit 161. FIG. 14 shows the power feeding coil 171 included in the power feeding device 170, as well as the charging circuit 161 and the like in the electric vehicle 160. The charging circuit 161 includes, for example, a power receiving coil 181, a rectifier circuit 182, and a constant-voltage circuit 183.

The charging circuit 161 includes the power receiving coil 181, the rectifier circuit 182, and the constant-voltage circuit 183. The power receiving coil 181 receives electric power from the power feeding coil 171 included in the power feeding device 170, by means of electromagnetic induction, magnetic resonance, or the like. The rectifier circuit 182 rectifies the received electric power for charging the secondary battery. The constant-voltage circuit 183 is a circuit for converting the rectified electric power to a voltage corresponding to a load.

The electric power converted to a constant voltage in the constant-voltage circuit 183 is used for, in addition to charging of the secondary battery 122 and the secondary battery 123, the temperature control in the temperature control unit 124C. It is possible that the temperature control unit 124C receives electric power fed from the charging circuit 161 without going through the secondary battery 122 and the secondary battery 123. Thus, temperature adjustment can be continued without consumption of electric power charged in the secondary battery 122 and the secondary battery 123, after charging of the secondary battery 122 and the secondary battery 123 is completed. The temperature adjustment, with the set temperature described in Embodiment 1, enables stable temperature control to be performed without consumption of electric power of the secondary battery.

Embodiment 3

In this embodiment, an example of a cylindrical secondary battery that can be used as the secondary batteries 122 and 123 or the like described in Embodiment 1 will be described with reference to FIG. 15.

Figure 15A:
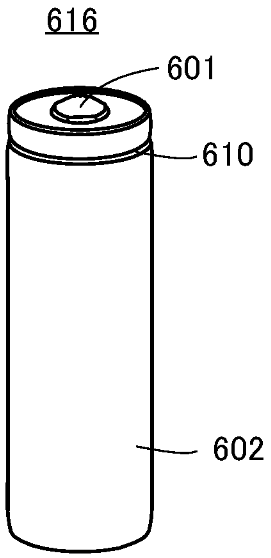
FIG. 15A is a diagram showing the appearance of a cylindrical secondary battery.

As illustrated in FIG. 15A, a cylindrical secondary battery 616 includes the positive electrode cap (battery cap) 601 on the top surface and the battery can (outer can) 602 on the side and bottom surfaces. The positive electrode cap and the battery can (outer can) 602 are insulated from each other by the gasket (insulating gasket) 610.

Figure 15B:
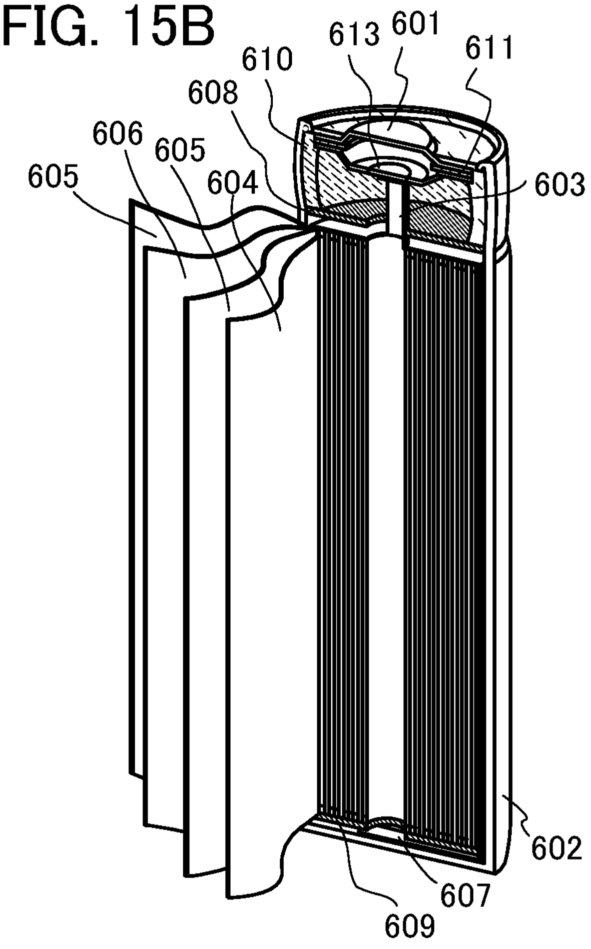
FIG. 15B is an exploded perspective view.

FIG. 15B is a diagram schematically illustrating a cross-section of the cylindrical secondary battery. Inside the battery can 602 having a hollow cylindrical shape, a battery element in which a strip-like positive electrode 604 and a strip-like negative electrode 606 are wound with a strip-like separator 605 located therebetween is provided. Although not illustrated, the battery element is wound around a center pin. One end of the battery can 602 is close and the other end thereof is open. For the battery can 602, a metal having corrosion resistance to a solvent, such as nickel, aluminum, or titanium, an alloy of such a metal, or an alloy of such a metal and another metal (e.g., stainless steel) can be used. The battery can 602 is preferably covered with nickel, aluminum, or the like in order to prevent corrosion due to the solvent. Inside the battery can 602, the battery element in which the positive electrode, the negative electrode, and the separator are wound is provided between a pair of insulating plates 608 and 609 that face each other. The inside of the battery can 602 provided with the battery element is filled with a nonaqueous electrolyte (not illustrated). As the nonaqueous electrolyte, an electrolyte similar to that for the coin-type secondary battery can be used.

Since a positive electrode and a negative electrode that are used for a cylindrical storage battery are wound, active materials are preferably formed on both surfaces of a current collector. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 613 and the bottom of the battery can 602, respectively. The safety valve mechanism 613 is electrically connected to the positive electrode cap 601 through a PTC element (Positive Temperature Coefficient) 611. The safety valve mechanism 613 cuts off electrical connection between the positive electrode cap 601 and the positive electrode 604 when the internal pressure of the battery exceeds a predetermined threshold. The PTC element 611, which is a thermally sensitive resistor whose resistance increases as temperature rises, limits the amount of current by increasing the resistance, in order to prevent abnormal heat generation. Barium titanate ($BaTiO_3$)-based semiconductor ceramic or the like can be used for the PTC element.

[Structure Examples of Secondary Battery]

Structure examples of secondary batteries are described with reference to FIG. 16 and FIG. 17.

Figure 16A:
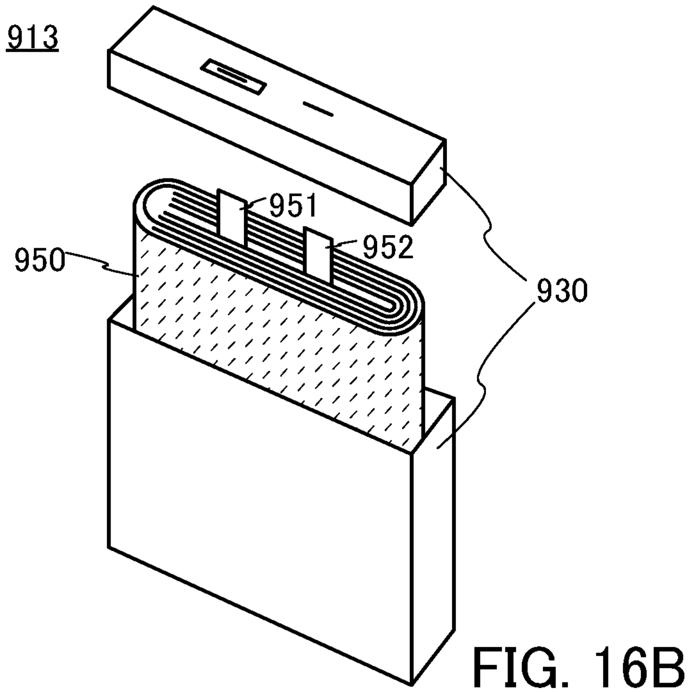
FIG. 16A and FIG. 16B are each a perspective view of a secondary battery.

A secondary battery 913 illustrated in FIG. 16A includes a wound body 950 provided with a terminal 951 and a terminal 952 inside a housing 930. The terminal 952 is in contact with the housing 930. The use of an insulating material or the like inhibits contact between the terminal 951 and the housing 930. Note that in FIG. 16A, the housing 930 divided into pieces is illustrated for convenience; however, in the actual structure, the wound body 950 is covered with the housing 930, and the terminal 951 and the terminal 952 extend to the outside of the housing 930. For the housing 930, a metal material (e.g., aluminum or the like) or a resin material can be used.

Figure 16B:
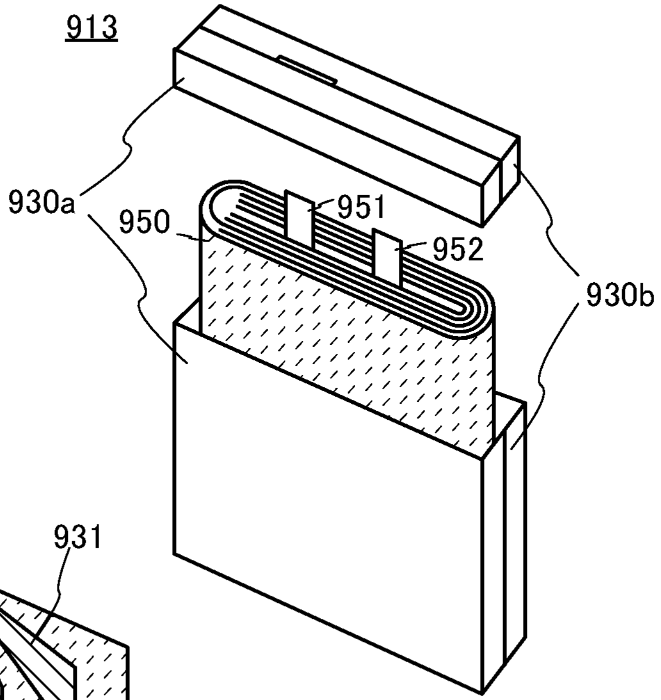

Note that as illustrated in FIG. 16B, the housing 930 in FIG. 16A may be formed using a plurality of materials. For example, in the secondary battery 913 illustrated in FIG. 16B, a housing 930*a* and a housing 930*b* are attached to each other, and the wound body 950 is provided in a region surrounded by the housing 930*a* and the housing 930*b*.

For the housing 930*a*, an insulating material such as an organic resin can be used. In particular, when a material such as an organic resin is used for the side on which an antenna is formed, blocking of an electric field by the secondary battery 913 can be inhibited. When an electric field is not significantly blocked by the housing 930*a*, an antenna may be provided inside the housing 930*a*. For the housing 930*b*, a metal material can be used, for example.

Figure 16C:
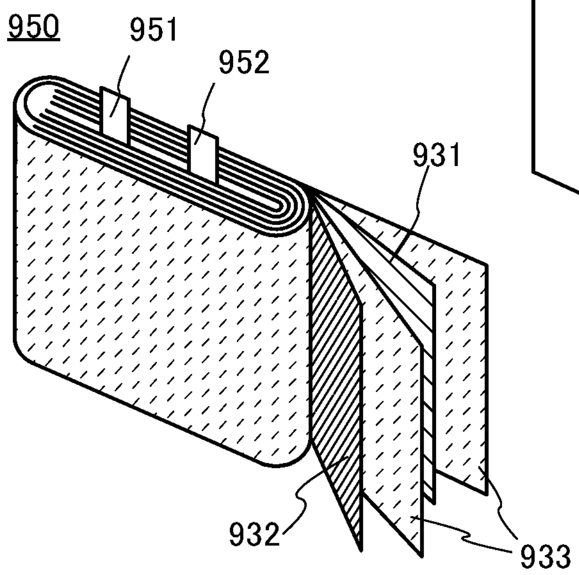
FIG. 16C is a perspective view of a wound body.

FIG. 16C illustrates the structure of the wound body 950. The wound body 950 includes a negative electrode 931, a positive electrode 932, and separators 933. The wound body 950 is obtained by winding a sheet of a stack in which the negative electrode 931 and the positive electrode 932 overlap with the separator 933 therebetween. Note that a plurality of stacks each including the negative electrode 931, the positive electrode 932, and the separators 933 may be further stacked.

Figure 17A:
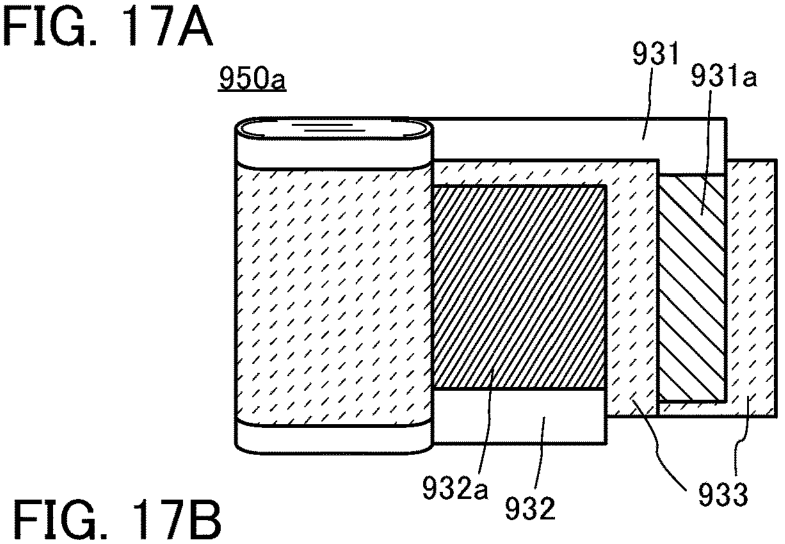
FIG. 17A is a schematic diagram of a wound body.

As illustrated in FIG. 17, the secondary battery 913 may include a wound body 950*a*. The wound body 950*a* illustrated in FIG. 17A includes the negative electrode 931, the positive electrode 932, and the separators 933. The negative electrode 931 includes a negative electrode active material layer 931*a*. The positive electrode 932 includes a positive electrode active material layer 932*a*.

The separator 933 has a larger width than the negative electrode active material layer 931*a* and the positive electrode active material layer 932*a*, and is wound to overlap the negative electrode active material layer 931*a* and the positive electrode active material layer 932*a*. In terms of safety, the width of the negative electrode active material layer 931*a* is preferably greater than that of the positive electrode active material layer 932*a*. The wound body 950*a* having such a shape is preferable because of its high degree of safety and high productivity.

Figure 17B:
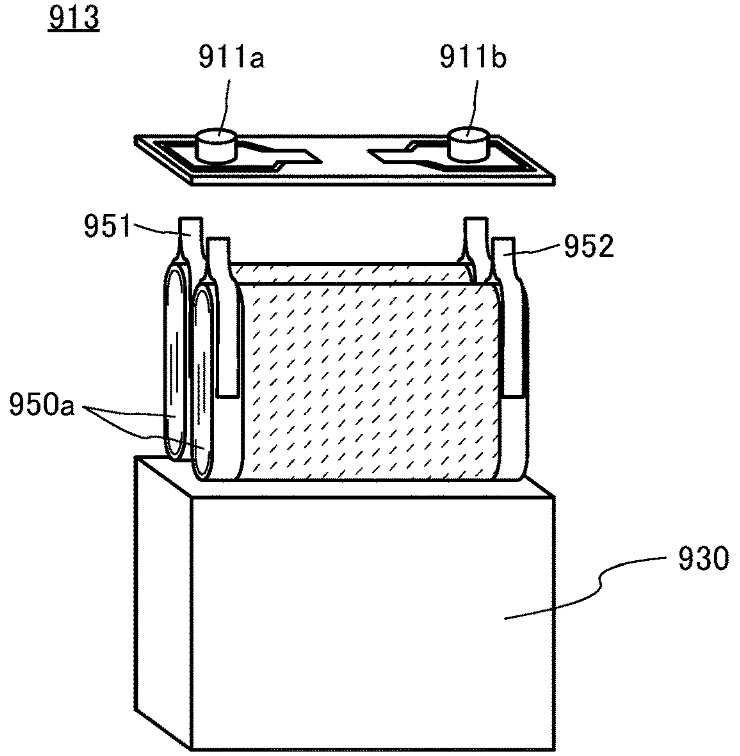
FIG. 17B is a diagram illustrating an internal structure of a secondary battery.

As illustrated in FIG. 17B, the negative electrode 931 is electrically connected to the terminal 951. The terminal 951 is electrically connected to a terminal 911*a*. The positive electrode 932 is electrically connected to the terminal 952. The terminal 952 is electrically connected to a terminal 911*b*. As illustrated in FIG. 17B, two wound bodies 950*a* are stored in one housing 930.

Figure 17C:
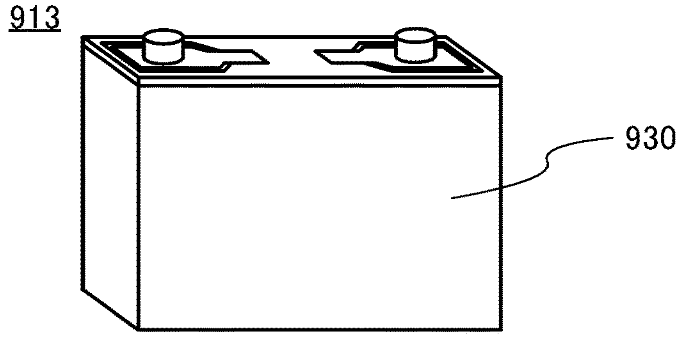
FIG. 17C is a diagram showing the appearance of a secondary battery.

As illustrated in FIG. 17C, the wound body 950*a* or the like is covered with the housing 930, whereby the secondary battery 913 is completed. The housing 930 is preferably provided with a safety valve, an overcurrent protection element, and the like. A safety valve is a valve to be released by a predetermined internal pressure of the housing 930 in order to prevent the battery from exploding.

As illustrated in FIG. 17B, the secondary battery 913 may include a plurality of wound bodies 950*a*. The use of the plurality of wound bodies 950*a* enables the secondary battery 913 to have higher charge and discharge capacity. The description of the secondary battery 913 illustrated in FIG. 16A to FIG. 16C can be referred to for the other components of the secondary battery 913 illustrated in FIG. 17A and FIG. 17B.

<Laminated Secondary Battery>

Figure 18A:
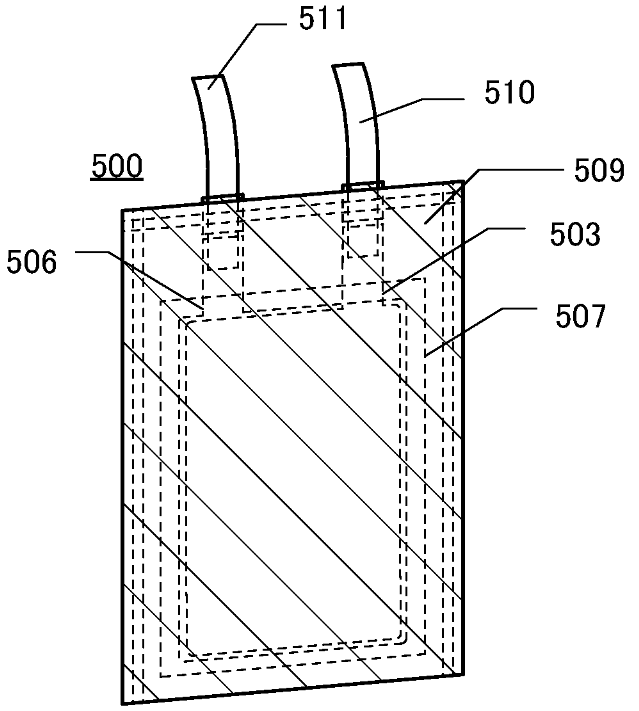
FIG. 18A and FIG. 18B are diagrams each showing the appearance of a secondary battery.
Figure 18B:
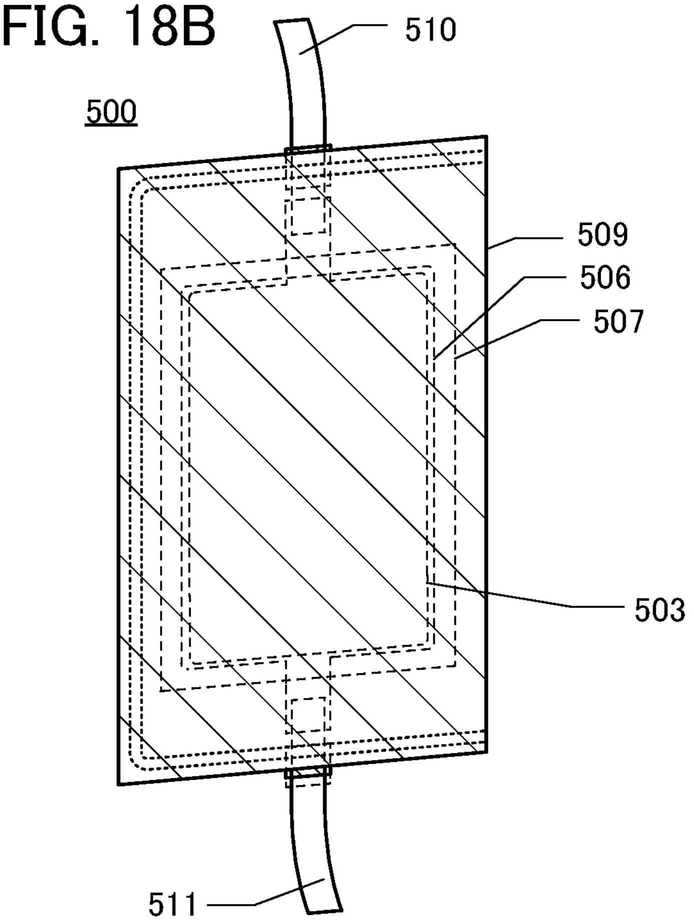

Next, examples of the appearance of a laminated secondary battery are shown in FIG. 18A and FIG. 18B. In the laminated secondary battery shown in FIG. 18A and FIG. 18B, there are a positive electrode 503, a negative electrode 506, a separator 507, an exterior body 509, a positive electrode lead electrode 510, and a negative electrode lead electrode 511.

Figure 19A:
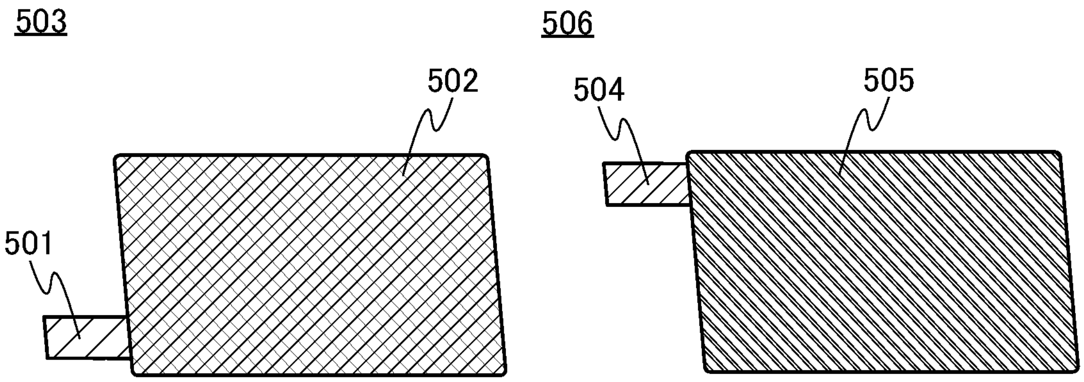
FIG. 19A is a diagram illustrating a positive electrode and a negative electrode.

FIG. 19A illustrates the appearance of the positive electrode 503 and the negative electrode 506. The positive electrode 503 includes a positive electrode current collector 501, and a positive electrode active material layer 502 is formed on a surface of the positive electrode current collector 501. The positive electrode 503 also includes a region where the positive electrode current collector 501 is partly exposed (hereinafter referred to as a tab region). The negative electrode 506 includes a negative electrode current collector 504, and a negative electrode active material layer 505 is formed on a surface of the negative electrode current collector 504. The negative electrode 506 also includes a region where the negative electrode current collector 504 is partly exposed, that is, a tab region. The areas or the shapes of the tab regions included in the positive electrode and the negative electrode are not limited to the examples shown in FIG. 19A.

<Method for Manufacturing Laminated Secondary Battery>

Figure 19B:
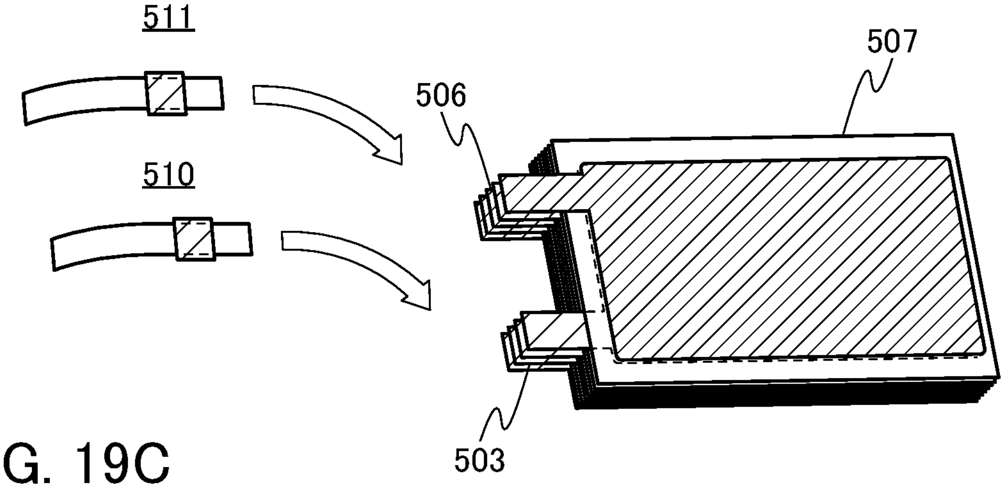
FIG. 19B is a diagram illustrating a state where electrode tabs are attached.

Here, an example of a method for manufacturing the laminated secondary battery whose external view is shown in FIG. 18A will be described with reference to FIG. 19B and FIG. 19C.

First, the negative electrode 506, the separator 507, and the positive electrode 503 are stacked. FIG. 19B illustrates the negative electrodes 506, the separators 507, and the positive electrodes 503 that are stacked. Here, an example in which five negative electrodes and four positive electrodes are used is shown. The component can also be referred to as a stack including the negative electrodes, the separators, and the positive electrodes. Next, the tab regions of the positive electrodes 503 are bonded to each other, and the positive electrode lead electrode 510 is bonded to the tab region of the positive electrode on the outermost surface. The bonding can be performed by ultrasonic welding, for example. In a similar manner, the tab regions of the negative electrodes 506 are bonded to each other, and the negative electrode lead electrode 511 is bonded to the tab region of the negative electrode on the outermost surface.

Then, the negative electrodes 506, the separators 507, and the positive electrodes 503 are placed over the exterior body 509.

[Negative Electrode]

The negative electrode includes a negative electrode active material layer and a negative electrode current collector. The negative electrode active material layer may include a conductive additive and a binding agent.

<Negative Electrode Active Material>

As the negative electrode active material, for example, an alloy-based material or a carbon-based material can be used.

For the negative electrode active material, an element that enables charge and discharge reactions by an alloying and a dealloying reaction with lithium can be used. For example, a material containing at least one of silicon, tin, gallium, aluminum, germanium, lead, antimony, bismuth, silver, zinc, cadmium, indium, and the like can be used. Such elements have higher capacity than carbon, and especially, silicon has a high theoretical capacity of 4200 mAh/g. For this reason, silicon is preferably used as the negative electrode active material. Alternatively, a compound containing any of the above elements may be used. Examples of the compound include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn. Here, an element that enables charge and discharge reactions by an alloying and a dealloying reaction with lithium and a compound containing the element, for example, may be referred to as an alloy-based material.

In this specification and the like, SiO refers, for example, to silicon monoxide. Note that SiO can alternatively be expressed as $SiO_x$. Here, x is preferably 1 or an approximate value of 1. For example, x is preferably greater than or equal to 0.2 and less than or equal to 1.5, further preferably greater than or equal to 0.3 and less than or equal to 1.2.

As the carbon-based material, graphite, graphitizing carbon (soft carbon), non-graphitizing carbon (hard carbon), carbon nanotube, graphene, carbon black, and the like may be used.

Examples of graphite include artificial graphite and natural graphite. Examples of artificial graphite include mesocarbon microbeads (MCMB), coke-based artificial graphite, and pitch-based artificial graphite. As artificial graphite, spherical graphite having a spherical shape can be used. For example, MCMB is preferably used because it may have a spherical shape. Moreover, MCMB may preferably be used because it can relatively easily have a small surface area. Examples of natural graphite include flake graphite and spherical natural graphite.

Graphite has a low potential substantially equal to that of a lithium metal (greater than or equal to 0.05 V and less than or equal to 0.3 V vs. $Li/Li^+$) when lithium ions are inserted into graphite (while a lithium-graphite intercalation compound is formed). For this reason, a lithium-ion secondary battery can have a high operating voltage. In addition, graphite is preferred because of its advantages such as a relatively high capacity per unit volume, relatively small volume expansion, low cost, and a higher level of safety than that of a lithium metal.

As the negative electrode active material, an oxide such as titanium dioxide ($TiO_2$), lithium titanium oxide ($Li_4Ti_5O_{12}$), a lithium-graphite intercalation compound ($Li_xC_6$), niobium pentoxide ($Nb_2O_5$), tungsten oxide ($WO_2$), or molybdenum oxide ($MoO_2$) can be used.

Alternatively, as the negative electrode active material, $Li_{3-x}M_xN$ (M is Co, Ni, or Cu) with a $Li_3N$ structure, which is a composite nitride of lithium and a transition metal, can be used. For example, $Li_{2.6}Co_{0.4}N_3$ is preferable because of high charge and discharge capacity (900 mAh/g and 1890 $mAh/cm^3$).

A composite nitride of lithium and a transition metal is preferably used, in which case lithium ions are contained in the negative electrode active material and thus the negative electrode active material can be used in combination with a material for a positive electrode active material that does not contain lithium ions, such as $V_2O_5$ or $Cr_3O_8$. Note that in the case of using a material containing lithium ions as a positive electrode active material, the nitride of lithium and a transition metal can be used as the negative electrode active material by extracting the lithium ions contained in the positive electrode active material in advance.

Alternatively, a material that causes a conversion reaction can be used for the negative electrode active material; for example, a transition metal oxide that does not form an alloy with lithium, such as cobalt oxide (CoO), nickel oxide (NiO), or iron oxide (FeO), may be used. Other examples of the material that causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

For the conductive additive and the binder that can be included in the negative electrode active material layer, materials similar to those for the conductive additive and the binder that can be included in the positive electrode active material layer can be used.

<Negative Electrode Current Collector>

As a material of the negative electrode current collector, one or more kinds of conductive materials selected from aluminum, titanium, copper, gold, chromium, tungsten, molybdenum, nickel, silver, and the like can be used. Note that a material that is not alloyed with carrier ions of lithium or the like is preferably used for the negative electrode current collector.

[Separator]

The separator is positioned between the positive electrode and the negative electrode. The separator can be formed using, for example, a fiber containing cellulose, such as paper, nonwoven fabric, glass fiber, ceramics, or synthetic fiber containing nylon (polyamide), vinylon (polyvinyl alcohol-based fiber), polyester, acrylic, polyolefin, or polyurethane. The separator is preferably processed into a bag-like shape to enclose one of the positive electrode and the negative electrode.

The separator may have a multilayer structure. For example, an organic material film of polypropylene, polyethylene, or the like can be coated with a ceramic-based material, a fluorine-based material, a polyamide-based material, a mixture thereof, or the like. Examples of the ceramic-based material include aluminum oxide particles and silicon oxide particles. Examples of the fluorine-based material include PVDF and polytetrafluoroethylene. Examples of the polyamide-based material include nylon and aramid (meta-based aramid and para-based aramid).

When the separator is coated with the ceramic-based material, the oxidation resistance is improved; hence, deterioration of the separator in charging and discharging at high voltage can be suppressed and thus the reliability of the secondary battery can be improved. When the separator is coated with a ceramic-based material, heat generation at the time of internal short-circuit melts the ceramic material and heat generation due to the internal short-circuit stops; thus, ignition is unlikely to occur and the stability can be improved. When the separator is coated with the fluorine-based material, the separator is easily brought into close contact with an electrode, resulting in high output characteristics. When the separator is coated with the polyamide-based material, in particular, aramid, the safety of the secondary battery is improved because heat resistance is improved.

For example, both surfaces of a polypropylene film may be coated with a mixed material of aluminum oxide and aramid. Alternatively, a surface of a polypropylene film that is in contact with the positive electrode may be coated with a mixed material of aluminum oxide and aramid, and a surface of the polypropylene film that is in contact with the negative electrode may be coated with the fluorine-based material.

With the use of a separator having a multilayer structure, the capacity per volume of the secondary battery can be increased because the safety of the secondary battery can be maintained even when the total thickness of the separator is small.

[Positive Electrode]

The positive electrode includes a positive electrode active material layer and a positive electrode current collector. The positive electrode active material layer may include a conductive additive and a binding agent.

<Positive Electrode Active Material>

A positive electrode active material preferably contains a metal serving as a carrier ion (hereinafter an element A). As the element A, an alkali metal such as lithium, sodium, or potassium or a Group 2 element such as calcium, beryllium, or magnesium can be used, for example.

In the positive electrode active material, carrier ions are extracted from the positive electrode active material due to charge. A larger amount of the extracted element A means a larger amount of ions contributing to the capacity of a secondary battery, increasing the capacity. Meanwhile, a large amount of the extracted element A easily causes collapse of the crystal structure of a compound contained in the positive electrode active material. Collapse of the crystal structure of the positive electrode active material may lead to a decrease in the discharge capacity due to charge and discharge cycles. The positive electrode active material contains the element X, whereby collapse of a crystal structure that would occur when carrier ions are extracted in charge of a secondary battery may be suppressed. Part of the element X substitutes at an element A position, for example. An element such as magnesium, calcium, zirconium, lanthanum, or barium can be used as the element X. As another example, an element such as copper, potassium, sodium, or zinc can be used as the element X. Two or more of the elements described above as the element X may be used in combination.

Furthermore, the positive electrode active material preferably contains halogen in addition to the element X. The positive electrode active material preferably contains halogen such as fluorine or chlorine. When the positive electrode active material contains the halogen, substitution of the element X at the position of the element A is promoted in some cases.

In the case where the positive electrode active material contains the element X or contains halogen in addition to the element X, electrical conductivity on the surface of the positive electrode active material is sometimes suppressed.

The positive electrode active material contains a metal whose valence number changes due to charge and discharge of a secondary battery (hereinafter an element M). The element M is a transition metal, for example. The positive electrode active material contains one or more of cobalt, nickel, and manganese, particularly cobalt, as the element M, for example. The positive electrode active material may contain, at an element M position, an element that has no valence number change and can have the same valence number as the element M, such as aluminum or the like, specifically, a trivalent representative element, for example. The above-described element X may be substituted at the element M position, for example. In the case where the positive electrode active material is an oxide, the element X may substitute at an oxygen position.

As the positive electrode active material, a lithium composite oxide having a layered rock-salt crystal structure is preferably used, for example. Specifically, as the lithium composite oxide having a layered rock-salt crystal structure, lithium cobalt oxide, lithium nickel oxide, a lithium composite oxide containing nickel, manganese, and cobalt, or a lithium composite oxide containing nickel, cobalt, and aluminum can be used, for example. Moreover, such a positive electrode active material is preferably represented by a space group R-3m.

In the positive electrode active material having a layered rock-salt crystal structure, increasing the charge depth may cause collapse of a crystal structure. Here, collapse of a crystal structure refers to displacement of a layer, for example. In the case where collapse of a crystal structure is irreversible, the capacity of a secondary battery might be decreased by repeated charges and discharges.

The positive electrode active material includes the element X, whereby the displacement of a layer can be suppressed even when the charge depth is increased, for example. By suppressing the displacement, a change in volume due to charge and discharge can be small. Accordingly, the positive electrode active material can achieve excellent cycle performance. In addition, the positive electrode active material can have a stable crystal structure in a high-voltage charging state. Thus, in the positive electrode active material, a short circuit is less likely to occur while the high-voltage charging state is maintained. This is preferable because the safety is further improved.

The positive electrode active material has a small change in the crystal structure and a small difference in volume per the same number of transition metal atoms between a sufficiently discharging state and a high-voltage charging state.

The positive electrode active material may be represented by the chemical formula $AM_yO_Z$($y>0$, $z>0$). For example, lithium cobalt oxide may be represented by $LiCoO_2$. As another example, lithium nickel oxide may be represented by $LiNiO_2$.

When the charge depth is greater than or equal to 0.8, the positive electrode active material, which contains the element X, may have a structure that is represented by the space group R-3m and is not a spinel crystal structure but is a structure where oxygen is hexacoordinated to ions of the element M (e.g., cobalt), the element X (e.g., magnesium), and the like and the cation arrangement has symmetry similar to that of the spinel crystal structure. This structure is referred to as a pseudo-spinel crystal structure in this specification and the like. Note that in the pseudo-spinel crystal structure, oxygen is tetracoordinated to a light element such as lithium in some cases. Also in that case, the ion arrangement has symmetry similar to that of the spinel crystal structure.

Extraction of carrier ions due to charge makes the structure of a positive electrode active material unstable. The pseudo-spinel crystal structure is said to be a structure that can maintain high stability in spite of extraction of carrier ions.

The pseudo-spinel crystal structure can be regarded as a crystal structure that contains Li between layers randomly and is similar to a $CdCl_2$ type crystal structure. The crystal structure similar to the $CdCl_2$ type crystal structure is close to a crystal structure of lithium nickel oxide when charged up to a charge depth of 0.94 ($Li_{0.06}NiO_2$); however, pure lithium cobalt oxide or a layered rock-salt positive electrode active material including a large amount of cobalt is known not to have this crystal structure generally.

Anions of a layered rock-salt crystal and anions of a rock-salt crystal have a cubic close-packed structure (face-centered cubic lattice structure). Anions of a pseudo-spinel crystal are also presumed to form a cubic close-packed structure. When the pseudo-spinel crystal is in contact with the layered rock-salt crystal and the rock-salt crystal, there is a crystal plane at which orientations of cubic close-packed structures composed of anions are aligned. Note that a space group of the layered rock-salt crystal and the pseudo-spinel crystal is R-3m, which is different from a space group Fm-3m of a rock-salt crystal (a space group of a general rock-salt crystal) and a space group Fd-3m of a rock-salt crystal (a space group of a rock-salt crystal having the simplest symmetry); thus, the Miller index of the crystal plane satisfying the above conditions in the layered rock-salt crystal and the pseudo-spinel crystal is different from that in the rock-salt crystal. In this specification, a state where the orientations of the cubic close-packed structures composed of anions in the layered rock-salt crystal, the pseudo-spinel crystal, and the rock-salt crystal are aligned is sometimes referred to as a state where crystal orientations are substantially aligned.

In the unit cell of the pseudo-spinel crystal structure, the coordinates of cobalt and oxygen can be represented by Co (0, 0, 0.5) and O (0, 0, x) within the range of $0.20 \le x \le 0.25$.

In the positive electrode active material, a difference between the volume of the unit cell with a charge depth of 0 and the volume per unit cell of the pseudo-spinel crystal structure with a charge depth of 0.82 is preferably less than or equal to 2.5%, further preferably less than or equal to 2.2%.

The pseudo-spinel crystal structure has diffraction peaks at 2θ of 19.30±0.20° (greater than or equal to 19.10° and less than or equal to 19.50°) and 2θ of 45.55±0.10° (greater than or equal to 45.45° and less than or equal to 45.65°). More specifically, sharp diffraction peaks appear at 2θ of 19.30±0.10° (greater than or equal to 19.20° and less than or equal to 19.40°) and 2θ of 45.55±0.05° (greater than or equal to 45.50° and less than or equal to 45.60).

Note that although the positive electrode active material has the pseudo-spinel crystal structure when being charged with a high voltage, not all the particles necessarily have the pseudo-spinel crystal structure. The particles may have another crystal structure, or some of the particles may be amorphous. Note that when the XRD patterns are analyzed by the Rietveld analysis, the pseudo-spinel crystal structure preferably accounts for more than or equal to 50 wt %, further preferably more than or equal to 60 wt %, still further preferably more than or equal to 66 wt % of the positive electrode active material. The positive electrode active material in which the pseudo-spinel crystal structure accounts for more than or equal to 50 wt %, further preferably more than or equal to 60 wt %, still further preferably more than or equal to 66 wt % can have sufficiently good cycle performance.

The number of atoms of the element X is preferably greater than or equal to 0.001 times and less than or equal to 0.1 times the number of atoms of the element M, further preferably greater than 0.01 and less than 0.04, still further preferably approximately 0.02. The concentration of the element X described here may be a value obtained by element analysis on the entire particle of the positive electrode active material using ICP-MS or the like, or may be a value based on the ratio of the raw materials mixed in the process of forming the positive electrode active material, for example.

In the case where cobalt and nickel are contained as the element M, the proportion of nickel atoms (Ni) in the sum of cobalt atoms and nickel atoms (Co+Ni) (Ni/(Co+Ni)) is preferably less than 0.1, further preferably less than or equal to 0.075.

The positive electrode active material is not limited to the materials described above.

As the positive electrode active material, a composite oxide with a spinel crystal structure can be used, for example. Alternatively, a polyanionic material can be used as the positive electrode active material, for example. Examples of the polyanionic material include a material with an olivine crystal structure and a material with a NASICON structure. Alternatively, a material containing sulfur can be used as the positive electrode active material, for example.

As the material with a spinel crystal structure, for example, a composite oxide represented by $LiM_2O_4$ can be used. It is preferable to contain Mn as the element M. For example, $LiMn_2O_4$ can be used. It is preferable to contain Ni in addition to Mn as the element M because the discharge voltage and the energy density of the secondary battery are increased in some cases. It is preferable to add a small amount of lithium nickel oxide ($LiNiO_2$, $LiNi_{1-x}M_xO_2$ (M=Co, Al, or the like)) to a lithium-containing material with a spinel crystal structure which contains manganese, such as $LiMn_2O_4$, because the performance of the secondary battery can be improved.

As a polyanionic material, for example, a composite oxide containing oxygen, the metal A, the metal M, and an element Z can be used. The metal A is one or more of Li, Na, and Mg; the metal M is one or more of Fe, Mn, Co, Ni, Ti, V, and Nb; and the element Z is one or more of S, P, Mo, W, As, and Si.

As the material with an olivine crystal structure, for example, a composite material (general formula $LiMPO_4$ (M is one or more of Fe(II), Mn(II), Co(II), and Ni(II)) can be used. Typical examples of the general formula $LiMPO_4$ include lithium compounds such as $LiFePO_4$, $LiNiPO_4$, $LiCoPO_4$, $LiMnPO_4$, $LiFeaNibPO_4$, $LiFeaCobPO_4$, $LiFeaMnbPO_4$, $LiNi_aCo_bPO_4$, $LiNi_aMn_bPO_4$ ($a+b \le 1$, $0<a<1$, and $0<b<1$), $LiFe_cNi_dCo_ePO_4$, $LiFe_cNi_dMn_ePO_4$, $LiNi_cCo_dMn_ePO_4$ ($c+d+e \le 1$, $0<c<1$, $0<d<1$, and $0<e<1$), and $LiFe_fNi_gCo_hMn_iPO_4$ ($f+g+h+i \le 1$, $0<f<1$, $0<g<1$, $0<h<1$, and $0<i<1$).

Alternatively, a composite material such as a general formula $Li_{(2-j)}MSiO_4$ (M is one or more of Fe(II), Mn(II), Co(II), and Ni(II); $0 \le j \le 2$) can be used. Typical examples of the general formula $Li_{(2-j)}MSiO_4$ include lithium compounds such as $Li_{(2-j)}FeSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ ($k+l \le 1$, $0<k<1$, and $0<l<1$), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ ($m+n+q \le 1$, $0<m<1$, $0<n<1$, and $0<q<1$), and $Li_{(2-j)}Fe_rNi_sCo_tMn_uSiO_4$ ($r+s+t+u \le 1$, $0<r<1$, $0<s<1$, $0<t<1$, and $0<u<1$).

Still alternatively, a NASICON compound represented by a general formula $A_xM_2(XO_4)_3$ (A=Li, Na, or Mg, M=Fe, Mn, Ti, V, or Nb, X=S, P, Mo, W, As, or Si) can be used. Examples of the NASICON compound include $Fe_2(MnO_4)_3$, $Fe_2(SO_4)_3$, and $Li_3Fe_2(PO_4)_3$. Further alternatively, a compound represented by a general formula $Li_2MPO_4F$, $Li_2MP_2O_7$, or $Li_5MO_4$ (M=Fe or Mn) can be used as the positive electrode active material.

Further alternatively, a perovskite fluoride such as $NaFeF_3$ and $FeF_3$, a metal chalcogenide (a sulfide, a selenide, or a telluride) such as $TiS_2$ and $MoS_2$, an oxide with an inverse spinel crystal structure such as $LiMVO_4$, a vanadium oxide ($V_2O_5$, $V_6O_{13}$, $LiV_3O_8$, or the like), a manganese oxide, an organic sulfur compound, or the like may be used as the positive electrode active material.

Alternatively, a borate-based material represented by a general formula $LiMBO_3$ (M is Fe(II), Mn(II), or Co(II)) may be used as the positive electrode active material.

As a material containing sodium, for example, an oxide containing sodium such as $NaFeO_2$, $Na_{2/3}[Fe_{1/2}Mn_{1/2}]O_2$, $Na_{2/3}[Ni_{1/3}Mn_{2/3}]O_2$, $Na_2Fe_2(SO_4)_3$, $Na_3V_2(PO_4)_3$, $Na_2FePO_4F$, $NaVPO_4F$, $NaMPO_4$ (M is Fe(II), Mn(II), Co(II), or Ni(II)), $Na_2FePO_4F$, or $Na_4Co_3(PO_4)_2P_2O_7$ may be used as the positive electrode active material.

As the positive electrode active material, a lithium-containing metal sulfide may be used. Examples of the lithium-containing metal sulfide are $Li_2TiS_3$ and $Li_3NbS_4$.

A mixture of two or more of the above-described materials may be used as the positive electrode active material used in this embodiment.

Figure 19C:
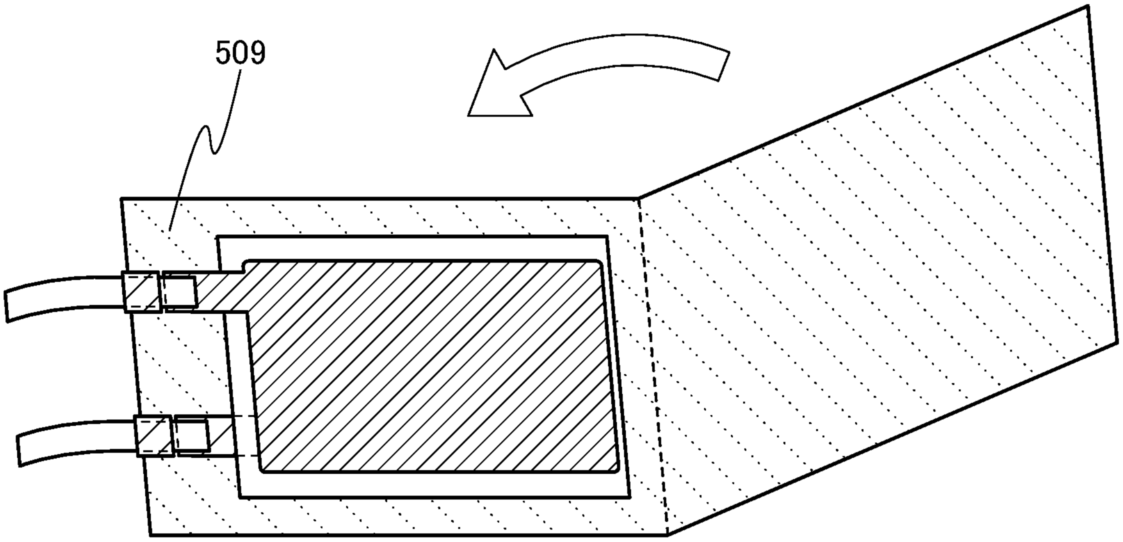
FIG. 19C is a diagram illustrating a state where electrodes are covered with an external body.

Subsequently, the exterior body 509 is folded along a portion shown by a dashed line, as illustrated in FIG. 19C. Then, the outer edges of the exterior body 509 are bonded to each other. The bonding can be performed by thermocompression, for example. At this time, an unbonded region (hereinafter referred to as an inlet) is provided for part (or one side) of the exterior body 509 so that an electrolyte solution (also referred to as an electrolyte) 508 can be introduced later.

Next, the electrolyte solution is introduced into the exterior body 509 from the inlet of the exterior body 509. The electrolyte solution is preferably introduced in a reduced pressure atmosphere or in an inert atmosphere. Lastly, the inlet is sealed by bonding. In this manner, the laminated secondary battery 500 can be manufactured.

<Positive Electrode Current Collector>

For the positive electrode current collector, it is possible to use a material having high conductivity, such as a metal such as gold, platinum, aluminum, titanium, copper, magnesium, iron, cobalt, nickel, zinc, germanium, indium, silver, or palladium or an alloy thereof. It is also possible to use aluminum to which an element that improves heat resistance, such as silicon, titanium, neodymium, scandium, or molybdenum, is added. A metal element that forms silicide by reacting with silicon may be used. Examples of the metal element that forms silicide by reacting with silicon include zirconium, titanium, hafnium, vanadium, niobium, tantalum, chromium, molybdenum, tungsten, cobalt, and nickel.

This embodiment can be freely combined with the other embodiments.

Embodiment 4

This embodiment describes an example of fabricating a semi-solid-state battery as the secondary battery 123 described in Embodiment 1.

Figure 20A:
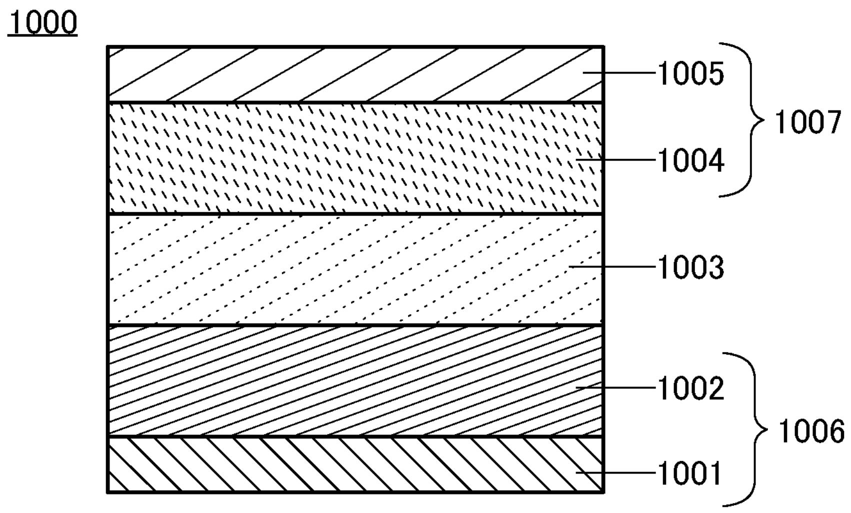
FIG. 20A is a cross-sectional view of a semi-solid-state battery.

FIG. 20A is a schematic cross-sectional view of a secondary battery 1000 of one embodiment of the present invention. The secondary battery 1000 includes a positive electrode 1006, an electrolyte layer 1003, and a negative electrode 1007. The positive electrode 1006 includes a positive electrode current collector 1001 and a positive electrode active material layer 1002. The negative electrode 1007 includes a negative electrode current collector 1005 and a negative electrode active material layer 1004.

Figure 20B:
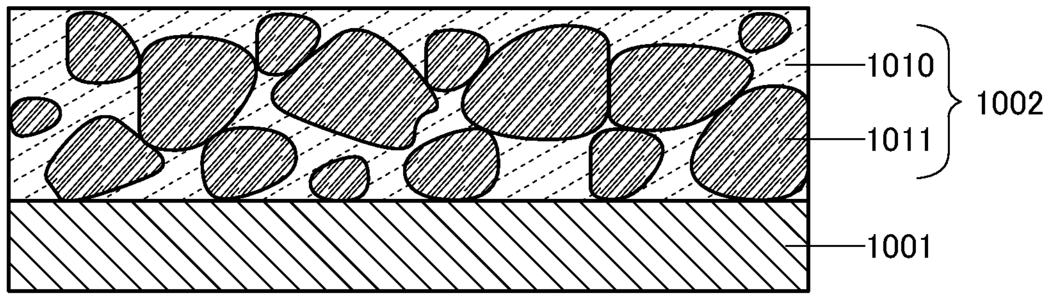
FIG. 20B is a cross-sectional view of a positive electrode.

FIG. 20B is a schematic cross-sectional view of the positive electrode 1006. The positive electrode active material layer 1002 of the positive electrode 1006 contains a positive electrode active material 1011, an electrolyte 1010, and a conductive material (also referred to as a conductive additive). The electrolyte 1010 contains a lithium-ion conductive polymer and a lithium salt. It is preferable that the positive electrode active material layer 1002 do not contain a binder.

Figure 20C:
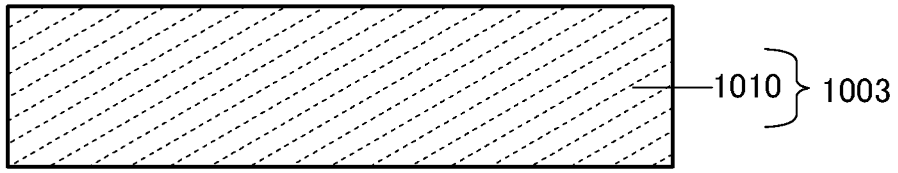
FIG. 20C is a cross-sectional view of an electrolyte layer.

FIG. 20C is a schematic cross-sectional view of the electrolyte layer 1003. The electrolyte layer 1003 contains the electrolyte 1010 containing a lithium-ion conductive polymer and a lithium salt.

In this specification and the like, the lithium-ion conductive polymer refers to a polymer having conductivity of cations such as lithium. More specifically, the lithium-ion conductive polymer is a high molecular compound including a polar group to which cations can coordinate. The polar group is preferably an ether group, an ester group, a nitrile group, a carbonyl group, siloxane, or the like.

As the lithium-ion conductive polymer, for example, polyethylene oxide (PEO), a derivative containing polyethylene oxide as its main chain, polypropylene oxide, polyacrylic acid ester, polymethacrylic acid ester, polysiloxane, polyphosphazene, or the like can be used.

The lithium-ion conductive polymer may have a branched or cross-linking structure. Alternatively, the lithium-ion conductive polymer may be a copolymer. The molecular weight is preferably greater than or equal to ten thousand, further preferably greater than or equal to hundred thousand, for example.

In the lithium-ion conductive polymer, lithium ions move by changing polar groups to interact with, due to the local motion (also referred to as segmental motion) of polymer chains. In PEO, for example, lithium ions move by changing oxygen to interact with, due to the segmental motion of ether chains. When the temperature is close to or higher than the melting point or softening point of the lithium-ion conductive polymer, the crystal regions are broken to increase amorphous regions, so that the motion of the ether chains becomes active and the ion conductivity increases. Thus, in the case where PEO is used as the lithium-ion conductive polymer, charging and discharging are preferably performed at higher than or equal to 60° C.

According to the ionic radius of Shannon (Shannon et al., Acta A 32 (1976) 751), the radius of a monovalent lithium ion is 0.590 Å in the case of tetracoordination, 0.76 Å in the case of hexacoordination, and 0.92 Å in the case of octacoordination. The radius of a bivalent oxygen ion is 1.35 Å in the case of bicoordination, 1.36 Å in the case of tricoordination, 1.38 Å in the case of tetracorrdination, 1.40 Å in the case of hexacoordination, and 1.42 Å in the case of octacoordination. The distance between polar groups included in adjacent lithium-ion conductive polymer chains is preferably greater than or equal to the distance that allows lithium ions and anion ions contained in the polar groups to exist stably while the above ionic radius is maintained. Furthermore, the distance between the polar groups is preferably close enough to cause interaction between the lithium ions and the polar groups. Note that the distance is not necessarily always kept constant because the segmental motion occurs as described above. The distance needs to be appropriate only when lithium ions are transferred.

As the lithium salt, it is possible to use a compound containing lithium and at least one or more of phosphorus, fluorine, nitrogen, sulfur, oxygen, chlorine, arsenic, boron, aluminum, bromine, and iodine. For example, one of lithium salts such as $LiPF_6$, $LiN(FSO_2)_2$ (lithium bis(fluorosulfonyl) imide, LiFSI), $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, $LiN(C_2F_5SO_2)_2$, and lithium bis(oxalate)borate (LiBOB) can be used, or two or more of these lithium salts can be used in an appropriate combination in an appropriate ratio.

It is particularly preferable to use LiFSI because favorable characteristics at low temperatures can be obtained. Note that LiFSI is less likely to react with water than $LiPF_6$ or the like. This can relax the dew point control in fabricating an electrode and an electrolyte layer that use LiFSI. For example, the fabrication can be performed even in a normal air atmosphere, not only in an inert atmosphere such as argon in which moisture is excluded as much as possible or in a dry room in which a dew point is controlled. This is preferable because the productivity can be improved. When the segmental motion of ether chains is used for lithium conduction, it is particularly preferable to use a Li salt that is highly dissociable and has a plasticizing effect, such as LiFSI or LiTFSA, in which case the operating temperature range can be wide.

In this specification and the like, a binder refers to a high molecular compound mixed only for binding an active material, a conductive material, and the like onto a current collector. A binder refers to, for example, a rubber material such as poly vinylidene difluoride (PVDF), styrene-butadiene rubber (SBR), styrene-isoprene-styrene rubber, butadiene rubber, or ethylene-propylene-diene copolymer; or a material such as fluorine rubber, polystyrene, polyvinyl chloride, polytetrafluoroethylene, polyethylene, polypropylene, polyisobutylene, or ethylene-propylene-diene polymer.

Since the lithium-ion conductive polymer is a high molecular compound, the positive electrode active material 1011 and the conductive material can be bound onto the positive electrode current collector 1001 when the lithium-ion conductive polymer is sufficiently mixed in the positive electrode active material layer 1002. Thus, the positive electrode 1006 can be fabricated without a binder. A binder is a material that does not contribute to charge and discharge reactions. Thus, a smaller number of binders enable higher proportion of materials that contribute to charging and discharging, such as an active material and an electrolyte. As a result, the secondary battery 1000 can have higher discharge capacity, higher rate characteristics, improved cycle performance, and the like.

When the positive electrode active material layer 1002 and the electrolyte layer 1003 both contain the electrolyte 1010, interface contact between the positive electrode active material layer 1002 and the electrolyte layer 1003 can be improved. As a result, the secondary battery 1000 can have higher rate characteristics, higher discharge capacity, improved cycle performance, and the like.

When containing no or extremely little organic solvent, the secondary battery can be less likely to catch fire and ignite and thus can have higher level of safety, which is preferable. When using the electrolyte 1010 containing no or extremely little organic solvent, the electrolyte layer 1003 can have enough strength and thus can electrically insulate the positive electrode from the negative electrode without a separator. Since a separator is not necessary, the secondary battery can have high productivity. When using the electrolyte 1010 containing an inorganic filler, the secondary battery can have higher strength and higher level of safety.

To obtain the electrolyte 1010 containing no or extremely little organic solvent, the electrolyte 1010 is preferably dried sufficiently. In this specification and the like, the electrolyte 1010 can be regarded as being dried sufficiently when a change in the weight after drying at 90° C. under reduced pressure for one hour is within 5%.

The electrolyte layer 1003 may contain an additive agent such as vinylene carbonate, propane sultone (PS), tert-butylbenzene (TBB), fluoroethylene carbonate (FEC), lithium bis(oxalate)borate (LiBOB), or a dinitrile compound such as succinonitrile or adiponitrile. The concentration of a material to be added is, for example, higher than or equal to 0.1 wt % and lower than or equal to 5 wt % with respect to the whole electrolyte layer 1003.

Note that materials contained in a secondary battery, such as a lithium-ion conductive polymer, a lithium salt, a binder, and an additive agent can be identified using nuclear magnetic resonance (NMR), for example. Analysis results of Raman spectroscopy, Fourier transform infrared spectroscopy (FT-IR), time-of-flight secondary ion mass spectrometry (TOF-SIMS), gas chromatography mass spectroscopy (GC/MS), pyrolysis gas chromatography mass spectroscopy (Py-GC/MS), liquid chromatography mass spectroscopy (LC/MS), or the like can also be used for the identification. Note that analysis by NMR or the like is preferably performed after the positive electrode active material layer 1002 is subjected to suspension using a solvent to separate the positive electrode active material 1011 from the other materials.

The positive electrode of this embodiment is not limited to have the cross-section illustrated in FIG. 20B. As an example different from that in FIG. 20B, FIG. 21A, FIG. 21B, FIG. 21C, and FIG. 21D each illustrate a cross section of a positive electrode.

Figure 21A:
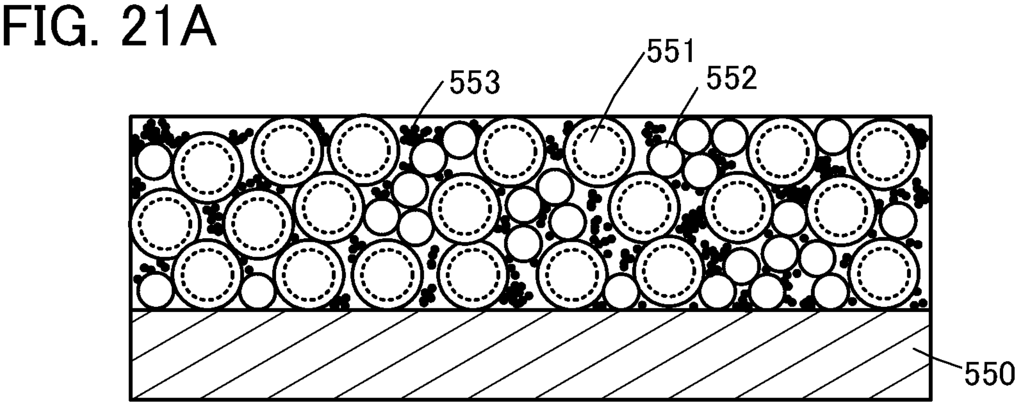
FIG. 21A, FIG. 21B, FIG. 21C, and FIG. 21D are cross-sectional views of positive electrodes.

In the positive electrode of the secondary battery, a binder (a resin) is mixed in order to fix the current collector 550 of metal foil or the like and the active material 551. The binder is also referred to as a binding material. Since the binder is a high molecular material, a large amount of binder lowers the proportion of the active material in the positive electrode, thereby reducing the discharge capacity of the secondary battery. Therefore, the amount of binder mixed is reduced to a minimum. In FIG. 21A, regions not filled with the active material 551 which is a positive electrode active material, the second active material 552, or the acetylene black 553 indicate spaces or binders.

In FIG. 21A, acetylene black 553 is shown as the conductive agent. FIG. 21A shows an example in which second active materials 552 with a smaller particle diameter than the active material 551 are mixed. The positive electrode in which particles with different particle sizes are mixed can have high density. The active material 551 has a core-shell structure. Note that "core" is used not to indicate a core of the entire particle, but to show the positional relationship between the particle center and outer shell. In addition, "core" can also be referred to as a core material. For example, the active material 551 uses first NCM (nickel cobalt lithium manganite) for its core and second NCM for its shell. A composite oxide represented by $LiNixCoyMnzO_2$ in which x:y:z=8:1:1 or x:y:z=9:0.5:0.5 can be used as the first NCM, and a composite oxide represented by $LiNixCoyMnzO_2$ in which x:y:z=1:1:1 can be used as the second NCM. Note that the atomic ratio of the second NCM is not limited to the above ratio. For example, when having a lower nickel proportion than the first NCM, the second NCM might have an effect similar to that of the second NCM having the above ratio.

In FIG. 21A, the boundary between the core region and the shell region of the active material 551 is indicated by a dotted line. Although FIG. 21A shows an example in which the active material 551 has a spherical shape, there is no particular limitation and other various shapes can be employed. The cross-sectional shape of the active material 551 may be an ellipse, a rectangle, a trapezoid, a pyramid, a quadrilateral with rounded corners, or an asymmetrical shape.

Figure 21B:
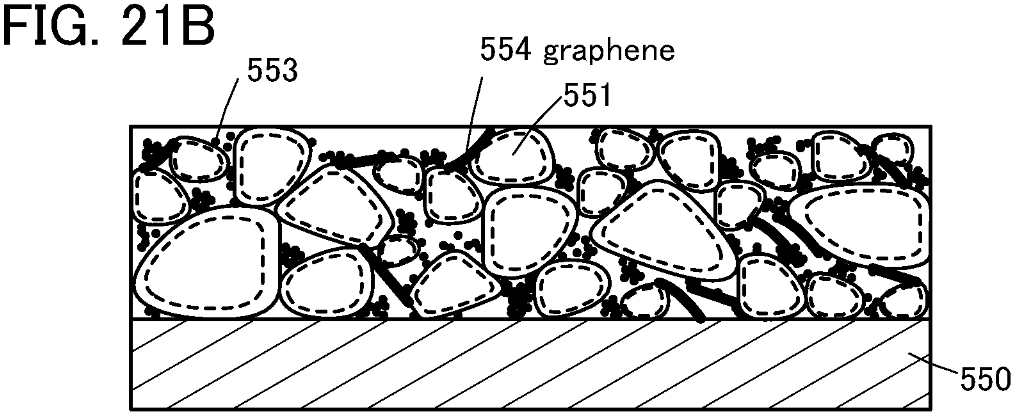

FIG. 21B shows an example in which the active materials 551 have various shapes. FIG. 21B shows the example different from that in FIG. 21A.

In the positive electrode in FIG. 21B, graphene 554 is used as a carbon material used as the conductive agent.

Graphene, which has electrically, mechanically, or chemically remarkable characteristics, is a carbon material that is expected to be applied to a variety of fields, such as field-effect transistors or solar batteries.

In FIG. 21B, a positive electrode active material layer containing the active material 551, the graphene 554, and the acetylene black 553 is formed over the current collector 550.

In the step of mixing the graphene 554 and the acetylene black 553 to obtain an electrode slurry, the weight of mixed carbon black is preferably 1.5 times to 20 times, further preferably 2 times to 9.5 times the weight of graphene.

When the graphene 554 and the acetylene black 553 are mixed in the above ratio range, the acetylene black 553 can be dispersed uniformly and less likely to be aggregated at the time of preparing the slurry. Furthermore, when the graphene 554 and the acetylene black 553 are mixed in the above ratio range, the positive electrode density can be higher than that of an electrode using only the acetylene black 553 as a conductive agent. As the electrode density is higher, the capacity per weight unit can be higher. Specifically, the density of the positive electrode active material layer measured by gravimetry can be higher than 3.5 g/cc. In addition, it is preferable that the active material 551 be used for the positive electrode and the graphene 554 and the acetylene black 553 be mixed in the above ratio range, in which case synergy for higher capacity of the secondary battery can be expected.

The above features are advantageous for secondary batteries for vehicles.

When a vehicle increases in weight with increasing number of secondary batteries, more energy is consumed to move the vehicle, which decreases the mileage. Even when the weight of the secondary batteries incorporated in the vehicle is unchanged, using high-density secondary batteries can maintain the mileage of the vehicle with almost no increase in the total weight of the vehicle.

Since electric power is needed to charge the secondary battery with higher capacity in the vehicle, the charging is desirably finished in a short time. What is called a regenerative charging, in which electric power is temporarily generated when the vehicle is braked and the electric power is used for charging, is performed under high rate charging conditions; thus, a secondary battery for a vehicle is desired to have favorable rate characteristics.

Using the active material 551 for the positive electrode and mixing acetylene black and graphene within an optimal range enable both higher electrode density and formation of an appropriate space needed for ion conduction, whereby a secondary battery for a vehicle which has high energy density and favorable output characteristics can be obtained.

In FIG. 21B, the boundary between the core region and the shell region of the active material 551 is indicated by a dotted line in the active material 551. In FIG. 21B, a region that is not filled with the active material 551, the graphene 554, or the acetylene black 553 represents a space or the binder. A space is required for the solvent to penetrate the positive electrode; too many spaces lower the electrode density, too few spaces do not allow the solvent to penetrate the positive electrode, and a space that remains after the secondary battery is completed lowers the efficiency.

Using the active material 551 for the positive electrode and mixing acetylene black and graphene within an optimal range enable both higher electrode density and formation of an appropriate space needed for ion conduction, whereby a secondary battery which has high energy density and favorable output characteristics can be obtained.

Figure 21C:
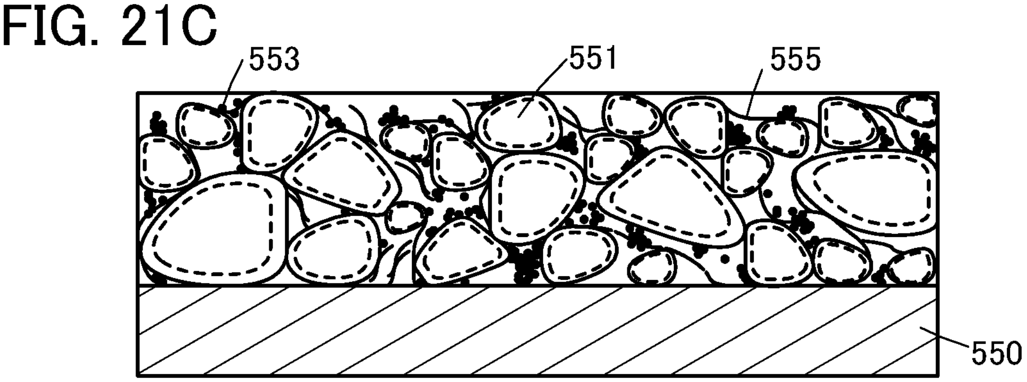

FIG. 21C shows an example of a positive electrode in which a carbon nanotube 555 is used instead of graphene. FIG. 21C shows the example different from that in FIG. 21B. With the use of the carbon nanotube 555, aggregation of carbon black such as the acetylene black 553 can be prevented and the dispersibility can be increased.

In FIG. 21C, a region that is not filled with the active material 551, the carbon nanotube 555, or the acetylene black 553 represents a space or the binder.

Figure 21D:
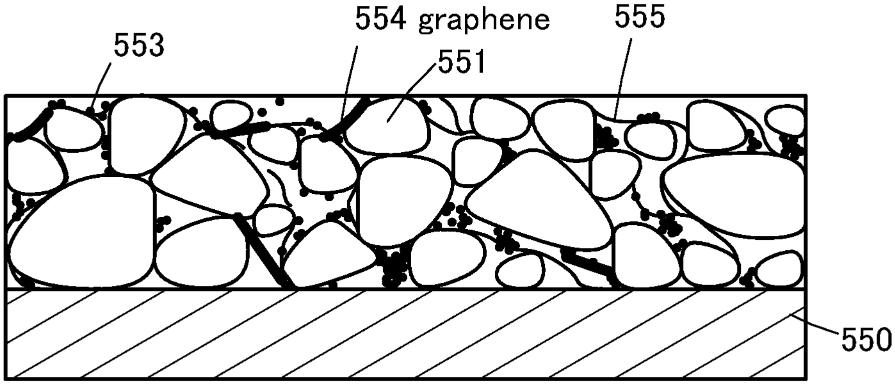

FIG. 21D shows another example of a positive electrode. In the example illustrated in FIG. 21D, the active material 551 does not have the core shell structure. In the example shown in FIG. 21D, the carbon nanotube 555 is used in addition to the graphene 554. With the use of both the graphene 554 and the carbon nanotube 555, aggregation of carbon black such as the acetylene black 553 can be prevented and the dispersibility can be further increased.

In FIG. 21D, a region that is not filled with the active material 551, the carbon nanotube 555, the graphene 554, or the acetylene black 553 represents a space or the binder.

A semi-solid-state secondary battery can be fabricated in the following manner: the electrolyte 1010 is provided over any one of the positive electrodes in FIG. 21A, FIG. 21B, FIG. 21C, and FIG. 21D, a negative electrode is provided over the electrolyte 1010, and the obtained stack is stored in a container (an exterior body, a metal can, or the like) or the like.

Although the structure example of a semi-solid-state secondary battery is described above, there is no particular limitation and a solvent can be used for the secondary battery. A secondary battery using a solvent can be fabricated in the following manner: a separator is provided over a positive electrode, a negative electrode is provided over the separator, the obtained stack is stored in a container (an exterior body, a metal can, or the like) or the like, and the container is filled with the solvent.

In this specification and the like, a polymer electrolyte secondary battery refers to a secondary battery in which an electrolyte layer between a positive electrode and a negative electrode contains a polymer. Polymer electrolyte secondary batteries include a dry (or intrinsic) polymer electrolyte battery and a polymer gel electrolyte battery. A polymer electrolyte secondary battery may be referred to as a semi-solid-state battery.

A semi-solid-state battery fabricated using the active material 551 is a secondary battery having high charge and discharge capacity. The semi-solid-state battery can have high charge and discharge voltage. Alternatively, a highly safe or highly reliable semi-solid-state battery can be achieved.

This embodiment can be freely combined with any of the other embodiments.

Embodiment 5

In this embodiment, examples of providing vehicles, moving objects, and the like with the secondary battery control system of one embodiment of the present invention will be described.

Figure 22A:
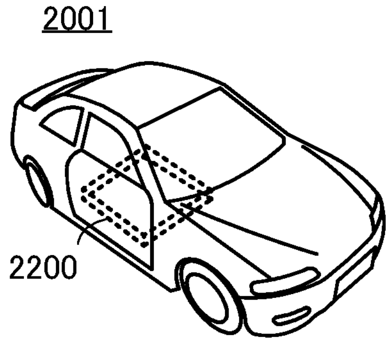
FIG. 22A is a diagram of an electric vehicle.

Examples of a transport vehicle using one embodiment of the present invention are shown in FIG. 22A, FIG. 22B, FIG. 22C, FIG. 22D, FIG. 22E, and FIG. 22F. An automobile 2001 illustrated in FIG. 22A is an electric vehicle that runs on an electric motor as a power source. The automobile 2001 illustrated in FIG. 22A includes a battery pack 2200, and the battery pack includes a secondary battery module in which a plurality of secondary batteries are connected to each other. Moreover, a secondary battery temperature control system that is electrically connected to the secondary battery module is preferably included. Provided with the secondary battery control system of one embodiment of the present invention, the automobile 2001 can reduce electric power of the secondary battery that is consumed for a purpose other than driving a power unit or the like, when the temperature of the secondary battery is set in a temperature range suitable for a certain objective.

Figure 22B:
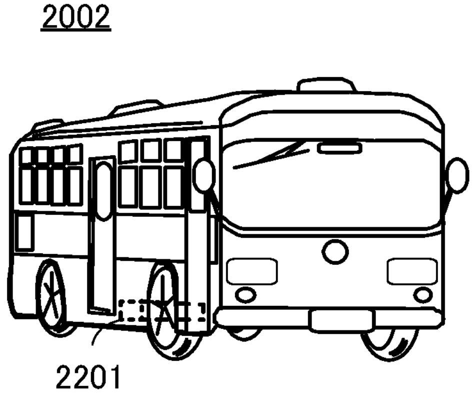
FIG. 22B and FIG. 22C are diagrams each illustrating an example of a transport vehicle.

FIG. 22B illustrates a large transporter 2002 having a motor controlled by electric power, as an example of a transport vehicle. A secondary battery module of the transporter 2002 includes a cell unit of four secondary batteries with 3.5 V or higher and 4.7 V or lower, for example, and 48 cells are connected in series to have a maximum voltage of 170 V. A battery pack 2201 has a function similar to that in FIG. 22A except that the number of secondary batteries forming the secondary battery module of the battery pack 2201 or the like is different; thus the description is omitted. Provided with the secondary battery control system of one embodiment of the present invention, the transporter 2002 can reduce electric power of the secondary battery that is consumed for a purpose other than driving a power unit or the like, when the temperature of the secondary battery is set in a temperature range suitable for a certain objective.

Figure 22C:
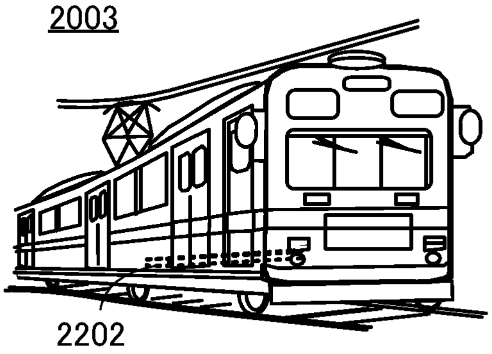

FIG. 22C illustrates a large transport vehicle 2003 having a motor controlled by electricity as an example. The secondary battery module of the transport vehicle 2003 has one hundred or more secondary batteries with 3.5 V or higher and 4.7 V or lower connected in series, and the maximum voltage is 600 V, for example. Thus, the secondary batteries are required to have a small variation in the characteristics. A battery pack 2202 has a function similar to that in FIG. 22A except that the number of secondary batteries forming the secondary battery module of the battery pack 2202 or the like is different; thus the detailed description is omitted. Provided with the secondary battery control system of one embodiment of the present invention, the transport vehicle 2003 can reduce electric power of the secondary battery that is consumed for a purpose other than driving a power unit or the like, when the temperature of the secondary battery is set in a temperature range suitable for a certain objective.

Figure 22D:
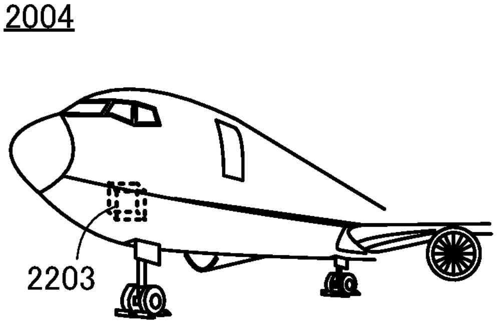
FIG. 22D is a diagram illustrating an example of an airplane.

FIG. 22D illustrates an aircraft 2004 having a combustion engine as an example. The aircraft 2004 illustrated in FIG. 22D can be regarded as a portion of a transport vehicle since it is provided with wheels for takeoff and landing, and has a battery pack 2203 including a secondary battery module and a charging control device; the secondary battery module includes a plurality of connected secondary batteries.

The secondary battery module of the aircraft 2004 has eight 4 V secondary batteries connected in series and has a maximum voltage of 32 V, for example. A battery pack 2203 has a function similar to that in FIG. 22A except that the number of secondary batteries forming the secondary battery module of the battery pack 2203 or the like is different; thus the detailed description is omitted. Provided with the secondary battery control system of one embodiment of the present invention, the aircraft 2004 can reduce electric power of the secondary battery that is consumed for a purpose other than driving a power unit or the like, when the temperature of the secondary battery is set in a temperature range suitable for a certain objective.

Figure 22E:
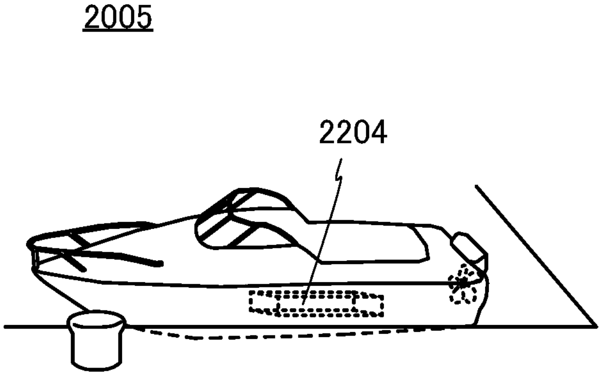
FIG. 22E is a diagram illustrating an example of a boat.

FIG. 22E illustrates a boat 2005 having a combustion engine as an example. The boat 2005 illustrated in FIG. 22E can be regarded as a portion of a transport vehicle as a transport means although it does not have wheels, and has a battery pack 2204 including a secondary battery module and a charging control device; the secondary battery module includes a plurality of connected secondary batteries.

The secondary battery module of the boat 2005 has eight 4 V secondary batteries connected in series and has a maximum voltage of 32 V, for example. A battery pack 2204 has a function similar to that in FIG. 22A except that the number of secondary batteries forming the secondary battery module of the battery pack 2204 or the like is different; thus the description is omitted. Provided with the secondary battery control system of one embodiment of the present invention, the boat 2005 can reduce electric power of the secondary battery that is consumed for a purpose other than driving a power unit or the like, when the temperature of the secondary battery is set in a temperature range suitable for a certain objective.

Figure 22F:
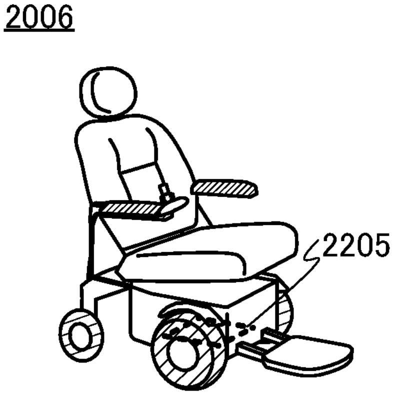
FIG. 22F is a diagram illustrating an example of a wheelchair.

FIG. 22F illustrates a wheelchair 2006 having a motor controlled by electric power, as an example of a transport vehicle. A battery pack 2205 has a function similar to that in FIG. 22A except that the number of secondary batteries forming the secondary battery module of the battery pack 2205 or the like is different; thus the description is omitted. Provided with the secondary battery control system of one embodiment of the present invention, the wheelchair 2006 can reduce electric power of the secondary battery that is consumed for a purpose other than driving a power unit or the like, when the temperature of the secondary battery is set in a temperature range suitable for a certain objective.

This embodiment can be freely combined with any of the other embodiments.

(Supplementary Notes on Description in this Specification and the Like)

The description of the above embodiments and each structure in the embodiments are noted below.

One embodiment of the present invention can be constituted by combining, as appropriate, the structure described in each embodiment with the structures described in the other embodiments and Example. In addition, in the case where a plurality of structure examples are described in one embodiment, the structure examples can be combined as appropriate.

Note that content (or part of the content) described in one embodiment can be applied to, combined with, or replaced with another content (or part of the content) described in the embodiment and/or content (or part of the content) described in another embodiment or other embodiments.

Note that in each embodiment, a content described in the embodiment is a content described with reference to a variety of drawings or a content described with text disclosed in the specification.

Note that by combining a diagram (or part thereof) described in one embodiment with another part of the diagram, a different diagram (or part thereof) described in the embodiment, and/or a diagram (or part thereof) described in another embodiment or other embodiments, much more diagrams can be formed.

In this specification and the like, components are classified on the basis of the functions, and shown as blocks independent of one another in block diagrams. However, in an actual circuit or the like, it is difficult to separate components on the basis of the functions, and there are such a case where one circuit is associated with a plurality of functions or a case where a plurality of circuits are associated with one function, for example. Therefore, blocks in the block diagrams are not limited by the components described in this specification, and the description can be changed appropriately depending on the situation.

In drawings, the size, the layer thickness, or the region is shown arbitrarily for description convenience. Therefore, they are not limited to the illustrated scale. Note that the drawings are schematically shown for clarity, and embodiments of the present invention are not limited to shapes, values, or the like shown in the drawings. For example, variation in signal, voltage, or current due to noise or variation in signal, voltage, or current due to difference in timing can be included.

Furthermore, the positional relationship between components illustrated in the drawings and the like is relative. Therefore, when the components are described with reference to drawings, terms for describing the positional relationship, such as "over" and "under", are sometimes used for convenience. The positional relationship of the components is not limited to that described in this specification and can be explained with other terms as appropriate depending on the situation.

In this specification and the like, expressions "one of a source and a drain" (or a first electrode or a first terminal) and "the other of the source and the drain" (or a second electrode or a second terminal) are used in the description of the connection relationship of a transistor. This is because a source and a drain of a transistor are interchangeable depending on the structure, operation conditions, or the like of the transistor. Note that the source or the drain of the transistor can also be referred to as a source (or drain) terminal, a source (or drain) electrode, or the like as appropriate depending on the situation.

In this specification and the like, the term "electrode", "wiring", or the like does not functionally limit these components. For example, an "electrode" is used as part of a "wiring" in some cases, and vice versa. Furthermore, the term "electrode", "wiring", or the like also includes the case where a plurality of "electrodes", "wirings", or the like are formed in an integrated manner, for example.

In this specification and the like, a node can be referred to as a terminal, a wiring, an electrode, a conductive layer, a conductor, an impurity region, or the like depending on a circuit structure, a device structure, or the like. Furthermore, a terminal, a wiring, or the like can be referred to as a node.

In this specification and the like, voltage and potential can be replaced with each other as appropriate. The voltage refers to a potential difference from a reference potential, and when the reference potential is a ground voltage, for example, the voltage can be rephrased into the potential. The ground potential does not necessarily mean 0 V. Note that potentials are relative, and the potential supplied to a wiring or the like is changed depending on the reference potential, in some cases.

In this specification and the like, the term "high-level potential" or "low-level potential" does not mean a particular potential. For example, in the case where two wirings are both described as "functioning as a wiring for supplying a high-level potential", the levels of the high-level potentials supplied from the wirings are not necessarily equal to each other. Similarly, in the case where two wirings are both described as "functioning as a wiring for supplying a low-level potential", the levels of the low-level potentials supplied from the wirings are not necessarily equal to each other.

"Current" means a charge transfer (electrical conduction); for example, the description "electrical conduction of positively charged particles occurs" can be rephrased as "electrical conduction of negatively charged particles occurs in the opposite direction". Therefore, unless otherwise specified, "current" in this specification and the like refers to a charge transfer (electrical conduction) accompanied by carrier movement. Examples of a carrier here include an electron, a hole, an anion, a cation, and a complex ion, and the type of carrier differs between current flow systems (e.g., a semiconductor, a metal, an electrolyte solution, and a vacuum). The "direction of a current" in a wiring or the like refers to the direction in which a carrier with a positive charge moves, and is expressed as positive current. In other words, the direction in which a carrier with a negative charge moves is opposite to the direction of a current, and is expressed as negative current. Thus, in the case where the polarity of current (or the direction of current) is not specified in this specification and the like, the description "current flows from element A to element B" can be rephrased as "current flows from element B to element A", for example. The description "current is input to element A" can be rephrased as "current is output from element A", for example.

In this specification and the like, the expression "A and B are connected" means the case where A and B are electrically connected. Here, the expression "A and B are electrically connected" means connection that enables electrical signal transmission between A and B in the case where an object (that refers to an element such as a switch, a transistor element, or a diode, a circuit including the element and a wiring, or the like) exists between A and B. Note that the case where A and B are electrically connected includes the case where A and B are directly connected. Here, the expression "A and B are directly connected" means connection that enables electrical signal transmission between A and B through a wiring (or an electrode) or the like, not through the above object. In other words, direct connection refers to connection that can be regarded as the same circuit diagram when represented by an equivalent circuit.

In this specification and the like, a switch is in a conduction state (on state) or in a non-conduction state (off state) to determine whether current flows or not. Alternatively, a switch has a function of selecting and changing a current path.

In this specification and the like, channel length refers to, for example, the distance between a source and a drain in a region where a semiconductor (or a portion where current flows in a semiconductor when a transistor is in an on state) and a gate overlap with each other or a region where a channel is formed in a top view of the transistor.

In this specification and the like, channel width refers to, for example, the length of a portion where a source and a drain face each other in a region where a semiconductor (or a portion where current flows in a semiconductor when a transistor is in an on state) and a gate electrode overlap with each other or a region where a channel is formed.

Note that in this specification and the like, the terms "film", "layer", and the like can be interchanged with each other depending on the case or according to circumstances. For example, the term "conductive layer" can be changed into the term "conductive film" in some cases. As another example, the term "insulating film" can be changed into the term "insulating layer" in some cases.

REFERENCE NUMERALS

100: control system, 110: arithmetic unit, 111: switch, 112: secondary battery monitoring unit, 120: secondary battery unit, 121: secondary battery monitoring unit, 121A: secondary battery monitoring unit, 121B: secondary battery monitoring unit, 122: secondary battery, 122A: secondary battery, 122B: secondary battery, 122C: battery cell, 123: secondary battery, 124: temperature control unit, 124A: temperature control unit, 124B: temperature control unit, 124C: temperature control unit, 125: metal pipe, 126: radiator, 127: heater, 128: motor, 129: temperature sensor, 130: data storage unit, 131: network unit, 132: position detection unit, 140: map information, 141A: point A, 141B: point B, 141C: point C, 142: charging station, 142A: charging station, 142E: charging station, 143: road, 144: path, 150A: remaining amount data, 150B: remaining amount data, 150C: remaining amount data, 151: panel, 152: icon, 160: electric vehicle, 161: charging circuit, 170: power feeding device, 171: power feeding coil, 181: power receiving coil, 182: rectifier circuit, 183: constant-voltage circuit, 500: secondary battery, 501: positive electrode current collector, 502: positive electrode active material layer, 503: positive electrode, 504: negative electrode current collector, 505: negative electrode active material layer, 506: negative electrode, 507: separator, 508: electrolyte solution, 509: exterior body, 510: positive electrode lead electrode, 511: negative electrode lead electrode, 550: current collector, 551: active material, 552: active material, 553: acetylene black, 554: graphene, 555: carbon nanotube, 601: positive electrode cap, 602: battery can, 603: positive electrode terminal, 604: positive electrode, 605: separator, 606: negative electrode, 607: negative electrode terminal, 608: insulating plate, 609: insulating plate, 611: PTC element, 612: safety valve mechanism, 911*a*: terminal, 911*b*: terminal, 913: secondary battery, 930: housing, 930*a*: housing, 930*b*: housing, 931: negative electrode, 931*a*: negative electrode active material layer, 932: positive electrode, 932*a*: positive electrode active material layer, 933: separator, 950: wound body, 950*a*: wound body, 951: terminal, 952: terminal, 1000: secondary battery, 1001: positive electrode current collector, 1002: positive electrode active material layer, 1003: electrolyte layer, 1004: negative electrode active material layer, 1005: negative electrode current collector, 1006: positive electrode, 1007: negative electrode, 1010: electrolyte, 1011: positive electrode active material, 1302: control circuit, 1303: motor controller, 1304: motor, 1305: gear, 1306: DC-DC circuit, 1307: electric power steering, 1309: defogger, 1310: DC-DC circuit, 1312: inverter, 1313: audio, 1314: power window, 1315: lamps, 1316: tire, 1317: rear motor, 2001: automobile, 2002: transporter, 2003: transport vehicle, 2004: aircraft, 2005: boat, 2006: wheelchair, 2200: battery pack, 2201: battery pack, 2202: battery pack, 2203: battery pack, 2204: battery pack, 2205: battery pack

The invention claimed is:

1. A control system for a secondary battery in a vehicle, the control system comprising a first secondary battery, a second secondary battery, a first temperature control unit, a secondary battery monitoring unit, and an arithmetic unit, wherein:

the secondary battery monitoring unit acquires remaining amount data of the first secondary battery, the arithmetic unit compares the remaining amount data and a set value, the secondary battery monitoring unit acquires a temperature of the first secondary battery in a case where the remaining amount data is smaller than the set value, the arithmetic unit calculates an adjustment term as a time period required to adjust the temperature of the first secondary battery to a set temperature, the arithmetic unit calculates an arrival term as a time period required to get to a set charging station, and the first temperature control unit starts adjusting the temperature of the first secondary battery to the set temperature, with electric power fed from the second secondary battery, in a case where the adjustment term is shorter than or equal to the arrival term.

2. A control system for a secondary battery in a vehicle, the control system comprising a first secondary battery, a second secondary battery, a first temperature control unit, a secondary battery monitoring unit, and an arithmetic unit, wherein:

the secondary battery monitoring unit acquires remaining amount data of the first secondary battery, the arithmetic unit compares the remaining amount data and a set value, the secondary battery monitoring unit acquires a temperature of the first secondary battery in a case where the remaining amount data is smaller than the set value, the arithmetic unit calculates an adjustment term as a time period required to adjust the temperature of the first secondary battery to a set temperature, the arithmetic unit calculates an arrival term as a time period required to get to a set charging station on the basis of map information with position information of the vehicle and position information of the charging station, and the first temperature control unit starts adjusting the temperature of the first secondary battery to the set temperature, with electric power fed from the second secondary battery, in a case where the adjustment term is shorter than or equal to the arrival term.

3. The control system for a secondary battery according to claim 1, wherein the vehicle comprises a charging circuit to charge the first secondary battery and the second secondary battery by wireless power feeding and a second temperature control unit, wherein the charging station comprises a power feeding coil to feed electric power to the charging circuit, and wherein the second temperature control unit performs adjustment of the temperature of the first secondary battery to the set temperature, with electric power fed from the power feeding coil.

4. The control system for a secondary battery according to claim 3, wherein the first secondary battery and the second secondary battery are each a lithium-ion secondary battery, wherein the first secondary battery is a lithium-ion secondary battery whose operating temperature range is a first temperature range, and wherein the second secondary battery is a lithium-ion secondary battery whose operating temperature range is a second temperature range including an upper limit of the first temperature range.

5. The control system for a secondary battery according to claim 4, wherein a lower limit of the second temperature range is at least lower than 25° C. and the upper limit of the first temperature range is at least higher than the second temperature range.

6. The control system for a secondary battery according to claim 4, wherein a viscosity of an electrolyte in the first secondary battery is lower than a viscosity of an electrolyte in the second secondary battery.

7. The control system for a secondary battery according to claim 1, wherein the first temperature control unit comprises a radiator and a heater, wherein the radiator is configured to lower the temperature of the first secondary battery, and wherein the heater is configured to raise the temperature of the secondary battery.

8. The control system for a secondary battery according to claim 1, wherein the secondary battery monitoring unit is configured to equalize voltages between the first secondary battery and the second secondary battery.

9. The control system for a secondary battery according to claim 1, wherein the set value is estimated arithmetic processing on the basis of an artificial neural network in the arithmetic unit.

10. The control system for a secondary battery according to claim 1, wherein the arithmetic unit compares an oxide semiconductor.

11. The control system for a secondary battery according to claim 2, wherein the vehicle comprises a charging circuit to charge the first secondary battery and the second secondary battery by wireless power feeding and a second temperature control unit, wherein the charging station comprises a power feeding coil to feed electric power to the charging circuit, and wherein the second temperature control unit performs adjustment of the temperature of the first secondary battery to the set temperature, with electric power fed from the power feeding coil.

12. The control system for a secondary battery according to claim 11, wherein the first secondary battery and the second secondary battery are each a lithium-ion secondary battery, wherein the first secondary battery is a lithium-ion secondary battery whose operating temperature range is a first temperature range, and wherein the second secondary battery is a lithium-ion secondary battery whose operating temperature range is a second temperature range including an upper limit of the first temperature range.

13. The control system for a secondary battery according to claim 12, wherein a lower limit of the second temperature range is at least lower than 25° C. and the upper limit of the first temperature range is at least higher than the second temperature range.

14. The control system for a secondary battery according to claim 12, wherein a viscosity of an electrolyte in the first secondary battery is lower than a viscosity of an electrolyte in the second secondary battery.

15. The control system for a secondary battery according to claim 2, wherein the first temperature control unit comprises a radiator and a heater, wherein the radiator is configured to lower the temperature of the first secondary battery, and wherein the heater is configured to raise the temperature of the secondary battery.

16. The control system for a secondary battery according to claim 2, wherein the secondary battery monitoring unit is configured to equalize voltages between the first secondary battery and the second secondary battery.

17. The control system for a secondary battery according to claim 2, wherein the set value is estimated arithmetic processing on the basis of an artificial neural network in the arithmetic unit.

18. The control system for a secondary battery according to claim 2, wherein the arithmetic unit compares an oxide semiconductor.

* * * * *